United States Patent
Pichumani et al.

(10) Patent No.: US 9,532,088 B2
(45) Date of Patent: Dec. 27, 2016

(54) TRICK-PLAY STREAMS FOR ADAPTIVE BITRATE STREAMING

(71) Applicant: ARRIS Enterprises, Inc., Suwanee, GA (US)

(72) Inventors: Padmagowri Pichumani, Bangalore (IN); Shailesh Ramamurthy, Bengaluru (IN); Padmassri Chandrashekar, Bangalore (IN)

(73) Assignee: ARRIS Enterprises, Inc., Suwanee, GA (US)

( * ) Notice: Subject to any disclaimer, the term of this patent is extended or adjusted under 35 U.S.C. 154(b) by 5 days.

(21) Appl. No.: 14/737,114

(22) Filed: Jun. 11, 2015

(65) Prior Publication Data
US 2015/0373383 A1    Dec. 24, 2015

Related U.S. Application Data

(60) Provisional application No. 62/014,063, filed on Jun. 18, 2014.

(51) Int. Cl.
*H04N 7/173*    (2011.01)
*H04N 21/2343*    (2011.01)
(Continued)

(52) U.S. Cl.
CPC ...... *H04N 21/234381* (2013.01); *H04N 19/31* (2014.11); *H04N 21/2387* (2013.01);
(Continued)

(58) Field of Classification Search
CPC ............ H04N 7/17318; H04N 21/47202; H04N 21/4331
(Continued)

(56) References Cited

U.S. PATENT DOCUMENTS

| 6,201,927 B1* | 3/2001 | Comer ............... H04N 5/783 375/E7.116 |
| 6,253,375 B1* | 6/2001 | Gordon ............ H04N 7/17336 348/E7.073 |

(Continued)

FOREIGN PATENT DOCUMENTS

| WO | 2011/100727 A1 | 8/2011 |
| WO | 2012/047158 A1 | 4/2012 |

OTHER PUBLICATIONS

PCT Search Report & Written Opinion, Re: Application No. PCT/US2015/035444, dated Aug. 20, 2015.

(Continued)

*Primary Examiner* — Annan Shang
(74) *Attorney, Agent, or Firm* — Thomas A. Ward

(57) ABSTRACT

A method of generating a trick-play stream is provided that includes providing a master trick-play stream having a plurality of groups of pictures, wherein each group of pictures comprises a leading intra-coded frame and a plurality of inter-coded frames, and frames within of each group of pictures encoded with a temporally scalable hierarchical encoding relationship, deriving a trick-play stream from the master trick-play stream for a particular temporal resolution by skipping a consistent pattern of frames from each group of pictures that are not needed to decode other frames at the particular temporal resolution according to the temporally scalable hierarchical encoding relationship, and providing the trick-play stream to a client device, wherein the trick-play stream is packaged to appear to the client device as a standards-compliant adaptive bitrate stream.

12 Claims, 19 Drawing Sheets

(51) Int. Cl.
*H04N 21/239* (2011.01)
*H04N 21/482* (2011.01)
*H04N 21/472* (2011.01)
*H04N 21/6587* (2011.01)
*H04N 21/845* (2011.01)
*H04N 21/2387* (2011.01)
*H04N 21/262* (2011.01)
*H04N 21/61* (2011.01)
*H04N 19/31* (2014.01)

(52) U.S. Cl.
CPC ... *H04N 21/2393* (2013.01); *H04N 21/23439* (2013.01); *H04N 21/234345* (2013.01); *H04N 21/26258* (2013.01); *H04N 21/47217* (2013.01); *H04N 21/4825* (2013.01); *H04N 21/6125* (2013.01); *H04N 21/6587* (2013.01); *H04N 21/8451* (2013.01); *H04N 21/8455* (2013.01); *H04N 21/8456* (2013.01)

(58) Field of Classification Search
USPC .................................. 725/88–93, 0.114–116
See application file for complete search history.

(56) References Cited

U.S. PATENT DOCUMENTS

| | | | | |
|---|---|---|---|---|
| 6,339,617 B1* | 1/2002 | Ueda | ............... | H04N 19/503 348/699 |
| 6,600,835 B1* | 7/2003 | Ishikawa | ............ | H04N 19/61 375/E7.151 |
| 6,680,976 B1* | 1/2004 | Chen | ............ | H04N 21/2383 375/240.12 |
| 6,973,130 B1* | 12/2005 | Wee | ............ | G06T 9/20 375/240.08 |
| 7,266,150 B2* | 9/2007 | Demos | ............ | H04N 19/147 375/240.15 |
| 7,505,590 B1* | 3/2009 | Apostolopoulos | ... | H04N 7/1675 380/210 |
| 8,111,754 B1* | 2/2012 | Demos | ............ | H04N 19/61 375/240.16 |
| 8,194,739 B2 | 6/2012 | Boyce et al. | | |
| 8,265,156 B2* | 9/2012 | Lee | ............ | H04N 19/52 375/240.16 |
| 8,515,265 B2 | 8/2013 | Kwon et al. | | |
| 8,763,053 B1* | 6/2014 | Goode | ............ | H04N 21/23109 725/92 |
| 9,137,555 B2* | 9/2015 | Frojdh | ............ | H04N 21/23439 |
| 9,330,722 B2* | 5/2016 | Chang | ............ | G11B 27/28 |
| 2005/0084010 A1* | 4/2005 | Benetiere | ............ | H04N 19/63 375/240.12 |
| 2005/0135783 A1* | 6/2005 | Crinon | ............ | H04N 21/23424 386/344 |
| 2005/0152448 A1* | 7/2005 | Crinon | ............ | H04N 21/23424 375/240.01 |
| 2006/0013305 A1 | 1/2006 | Sun | | |
| 2006/0056510 A1* | 3/2006 | Van Der Schaar | .. | H04N 21/631 375/240.12 |
| 2008/0232452 A1* | 9/2008 | Sullivan | ............ | H03H 17/0294 375/232 |
| 2010/0142917 A1 | 6/2010 | Isaji | | |
| 2013/0058480 A1 | 3/2013 | Ziskind et al. | | |
| 2013/0188708 A1* | 7/2013 | Rusert | ............ | H04N 19/597 375/240.12 |
| 2015/0373383 A1* | 12/2015 | Pichumani | ..... | H04N 21/234381 725/90 |

OTHER PUBLICATIONS

Y. Chen, et al., "Response to the CfP on HTTP Streaming: Adaptive Video Streaming based on AVC", 93rd MPEG Meeting (Motion Picture Expert Group or ISO/IEC JTC1/SC29/WG11), Jul. 24, 2010.

Pantos, R. et al., "HTTP Live Streaming: draft-pantos-http-live-streaming-08", Internet Engineering Task Force (IETF), Internet Draft, Mar. 2012.

Zhang, G., et al., "Implementing Hierarchical Trick Play for HTTP Video Streaming", IEEE International Workshop on Management of Emerging Networks and Services, Jul. 2010.

* cited by examiner

TRICK-PLAY STREAMS FOR ADAPTIVE BITRATE STREAMING

CLAIM OF PRIORITY

This Application claims priority under 35 U.S.C. §119(e) from earlier filed U.S. Provisional Application Ser. No. 62/014,063, filed Jun. 18, 2014, which is hereby incorporated by reference.

TECHNICAL FIELD

The present disclosure relates to the field of video encoding and streaming, particularly regarding preparing and decoding trick-play streams for adaptive bitrate streaming.

BACKGROUND

Over-the-top (OTT) delivery of live or prerecorded media content to client devices such as set-top boxes, computers, smartphones, mobile devices, tablet computers, gaming consoles, and other devices over networks such as the internet has become increasingly popular. Delivery of such media content commonly relies on adaptive bitrate streaming technologies such as HTTP Live Streaming (HLS), Smooth Streaming, and MPEG-DASH.

Adaptive bitrate streaming allows content to be encoded at different bitrates, such that different versions encoded at different bitrates can be delivered to client devices depending on factors such as network conditions and the receiving client device's processing capacity. For example, when the network is congested, a version of the content encoded with a low bitrate can be streamed to a client device until network conditions improve, at which point a higher bitrate version can be streamed to the client device.

Media content encoded with adaptive bitrate streaming techniques is often divided into multiple segments. This can allow client devices to request or receive different segments of the media content at different quality levels depending on network conditions or other factors. It can also allow client devices to quickly move to different points within the media content by requesting specific segments. For instance, a user can request that playback of a movie begin at twenty minutes into the movie, and a client device can accordingly request a segment of the movie's encoded media content that begins closest to the twenty minute mark.

As described above, existing adaptive bitrate streaming solutions allow client devices to jump to desired points within the media content by requesting specific segments of the media content. However, existing adaptive bitrate streaming solutions are not well suited for other types of playback features that many users expect or desire. For example, in analogue video or film systems, playback of frames can be physically sped up or reversed to allow users to fast-forward through content or rewind the content. However, in the digital environment of adaptive bitrate streaming, individual frames would need to be delivered and decoded at a very high rate to imitate analogue fast-forwarding or rewinding. Doing so is generally not practical, as it can require significant bandwidth and/or can exceed the processing capabilities of the client device.

Instead of quickly decoding and displaying every frame to present a fast-forwarded or rewound version of media content, many adaptive bitrate streaming solutions have attempted to emulate these types and other types of playback with "trick mode" or "trick-play" functions. Trick-play methods process the frames of digitally encoded media content in various ways to allow fast forwarding, rewinding, pausing, seeking, random-access, frame stepping, and other functions.

However, existing methods of fast forwarding and rewinding digital content are choppy in comparison with the smoothness displayed in analogue fast forwarding and rewinding, due to the way digitally media content is generally encoded and compressed. In digital encoding of media content, each frame is generally encoded either with intra prediction or inter prediction. An intra frame, also referred to as an I-frame or key frame, is encoded independently of other frames using only data within the intra frame. In contrast, an inter frame is encoded with reference to one or more other frames, such as encoding the differences between the inter frame and the reference frame. P-frames are inter frames that are coded with reference to previous frames, while B-frames are inter frames that are coded with reference to both previous and subsequent frames. Because frames close together in media content are often very similar, and may only have minor differences such as variations in location of an object that moves between frames, data that has already been encoded or decoded for one frame can be reused or referenced when encoding or decoding another frame. The data needed to encode an inter frame, for instance data describing differences in the frame relative to another frame that has already been encoded, can often be significantly smaller than the data needed to encode an entire intra frame.

Many compression schemes, such as H.264 or MPEG-2, encode a relatively small number of frames as I-frames and encode the majority of frames as P-frames or B-frames. This approach can save significant space and/or bandwidth, because inter frames can be encoded with relatively small amounts of information compared to encoding a complete frame. These types of compression schemes generally work well for normal playback of media content. However, prior compression schemes and methods of encoding media content for adaptive bitrate streaming do not work well for implementing trick-play modes.

It is generally impractical to decode and display media content at an increased rate using normal adaptive bitrate streaming techniques to simulate fast-forwarding or rewinding. Most client devices cannot decode inter frames quickly enough to present smooth fast-forwarding or rewinding, because inter frames depend on other frames that also must be decoded. For this reason, most existing adaptive bitrate streaming implementations avoid decoding inter frames during trick-plays, and instead rely on exclusively decoding intra frames and skipping inter frames. However, intra frames often appear relatively infrequently and/or at irregular intervals within encoded media content. By exclusively decoding intra frames, these implementations often lead to choppy video with the appearance of an almost random selection of frames being presented to a viewer instead of a smoothly sped up video with frames being presented at consistent time intervals.

Existing implementations that exclusively rely on streaming intra frames to client devices are also inefficient. Because intra frames are not compressed based on data from other frames, they require more data to store and transmit than more heavily compressed inter frames. Exclusively streaming the larger intra frames during trick-plays can result in heavy bandwidth usage compared to normal playback that also includes smaller inter frames.

Additionally, although security and encryption is a large concern for many providers of media content, encryption techniques for trick-plays in adaptive bitrate streaming have yet to be defined or standardized.

SUMMARY

What is needed is an adaptive bitrate streaming solution with trick-mode support, wherein a master trick-play stream is provided in addition to streams encoded at different bitrates. The master trick-play stream should be encoded with a temporally scalable hierarchical relationship between inter frames and intra frames, such that frames at consistent time intervals can be used to derive trick-play streams at various temporal resolutions from the master trick-play stream plays to present trick-plays such as fast-forwarding or rewinding.

In one embodiment, the present disclosure provides for a method of generating a trick-play stream, the method comprising providing a master trick-play stream at a network element, the master trick-play stream having a plurality of groups of pictures, wherein each group of pictures comprises a leading intra-coded frame and a plurality of inter-coded frames, and frames within of each group of pictures are encoded with a temporally scalable hierarchical encoding relationship, deriving a trick-play stream from the master trick-play stream for a particular temporal resolution by skipping a consistent pattern of frames from each group of pictures that are not needed to decode other frames at the particular temporal resolution according to the temporally scalable hierarchical encoding relationship, and providing the trick-play stream to a client device, wherein the trick-play stream is packaged to appear to the client device as a standards-compliant adaptive bitrate stream.

In another embodiment, the present disclosure provides for a method of transitioning between regular and trick mode playback of media content, the method comprising receiving a playlist at a client device from a network element, the playlist describing locations of a plurality of adaptive bitrate streams at the network element, wherein the plurality of adaptive bitrate streams are different versions of media content encoded for different conditions, the playlist also providing access to one or more trick-play streams at the network element, wherein one or more trick-play streams are fast-forwarded or reversed versions of the media content, beginning playback of the media content at the client device by requesting one of the plurality of adaptive bitrate streams, receiving a trick mode command from a user at the client device during playback of one of the plurality of adaptive bitrate streams, and interpreting the trick mode command at the client device and requesting an appropriate trick-play stream corresponding to the trick mode command, such that playback of the media content transitions from playback of one of the plurality of adaptive bitrate streams to playback of the appropriate trick-play stream.

In another embodiment, the present disclosure provides for a content delivery system, the content delivery system comprising a network element configured to store a master trick-play stream having a plurality of groups of pictures, wherein each group of pictures comprises a leading I-frame and a plurality of P-frames, and frames within of each group of pictures are encoded with a temporally scalable hierarchical encoding relationship, a bitstream extractor configured to extract frames from the master trick-play stream stored on the network element, wherein the bitstream extractor extracts specific frames and skips other frames in the consistent pattern of frames, and a bitstream packaging module configured to package the frames extracted by the bitstream extractor into a trick-play stream and send the trick-play stream to a client device, wherein the bitstream packaging module is configure to package the trick-play stream such that it appears to the client device as a standards-compliant adaptive bitrate stream.

BRIEF DESCRIPTION OF THE DRAWINGS

Further details of the present invention are explained with the help of the attached drawings in which.

DETAILED DESCRIPTION

Figure 1A:
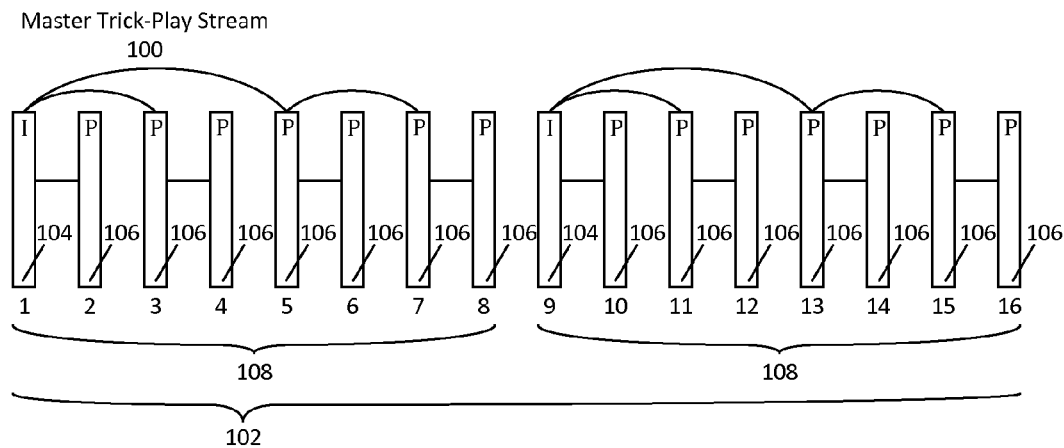
FIG. 1A depicts a first exemplary embodiment of a master trick-play stream encoded with a temporally scalable hierarchical relationship.

FIG. 1A depicts a portion of a master trick-play stream 100 for adaptive bitrate streaming. A master trick-play stream 100 can be an encoded version of a piece of media content comprising a plurality of frames 102. Each frame 102 can either be encoded as an intra-coded frame (I-frame) 104 or an inter-coded frame (P-frame or B-frame) 106. I-frames 104 (also known as key frames) can be encoded without reference to any other frames 102. Inter-coded frames 106 can be encoded with reference to one or more previous and/or subsequent frames 102.

In some embodiments, the frames 102 in the master trick-play stream 100 can be grouped into segments called groups of pictures (GOPs) 108. In some video encoding schemes, such as H.264, a GOP 108 can also be referred to as a coded-video-sequence. Each GOP 108 can begin with an I-frame 104, followed by a preset number of inter-coded frames 106 that depend from the GOP's initial I-frame 104. By way of a non-limiting example, FIG. 1A depicts two sequential GOPs 108 in a master trick-play stream 100, each with an initial I-frame 104 and seven inter-coded P-frames 106 that depend at one or more levels from the initial I-frame 104.

The frames 102 in each GOP 108 can be encoded with a consistent, temporally scalable, hierarchical relationship between the inter-coded frames 106 and the leading I-frame 104. By way of a non-limiting example, as shown in FIG. 1A, each GOP 108 can have eight frames 102 encoded with a hierarchical relationship wherein the second, fourth, sixth, and eighth frame 102 are P-frames 106 without any dependent P-frames 106; the third and seventh frame 102 are P-frames 106 with one dependent P-frame 106 (the fourth and eighth frame 102 respectively); and the fifth frame 102 is a P-frame 106 with two dependent P-frames 106 (the sixth and seventh frame 102).

The master trick-play stream 100 can be decoded by a client device, such as a set-top box or any other decoder. A decoder can decode the leading I-frame 104 in each GOP 108 directly, and can decode each dependent inter-coded frame 106 by first decoding one or more prior frames 102 from which the inter-coded frame 106 depends and then reconstructing the inter-coded frames 106 based on its relationship with the prior decoded frames 102. By way of a non-limiting example, in FIG. 1A frame 1 is an I-frame 104 and frame 2 is a P-frame 106 that depends from frame 1. To decode frame 2, a decoder can first decode frame 1 and then use it to decode frame 2. As another non-limiting example, in FIG. 1A frame 4 is a P-frame 106 that depends from frame 3, which itself is a P-frame 106 that depends from frame 1. To decode frame 4, a decoder can first decode frame 1, use it to decode frame 3, and then use the decoded frames to decode frame 4.

Due to the temporally scalable hierarchical relationship of the frames 102 in each GOP 108 of the master trick-play stream 100, trick-play streams 110 with different temporal resolutions can be derived from the master trick-play stream 100 by dropping or skipping certain frames 102 from the master trick-play stream 100. Each temporal resolution can correspond to decoding and playing back the media content at a different speed. As will be explained below, when a client device requests a trick-play at particular speed, a trick-play stream 110 suitable for decoding and playback at that speed can be derived from the master trick-play stream 100 and served to the client device.

Figure 1B:
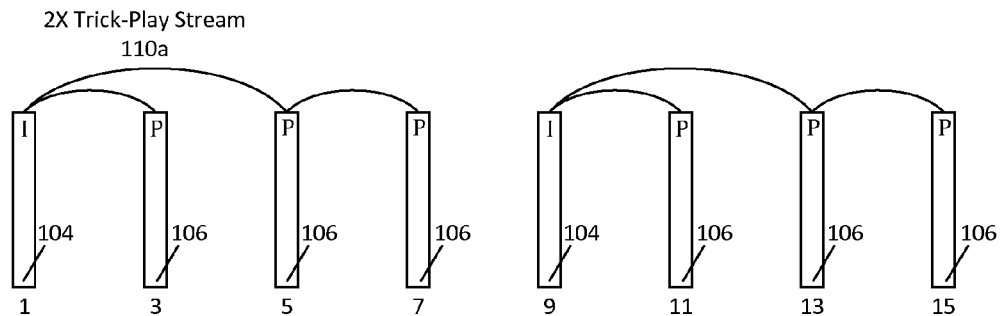
FIG. 1B depicts an embodiment of a 2× trick-play stream derived from the master trick-play stream of FIG. 1A.
Figure 1C:
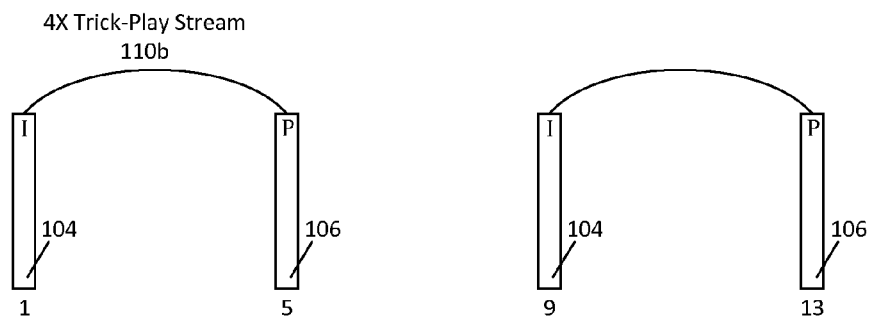
FIG. 1C depicts an embodiment of a 4× trick-play stream derived from the master trick-play stream of FIG. 1A.
Figure 1D:
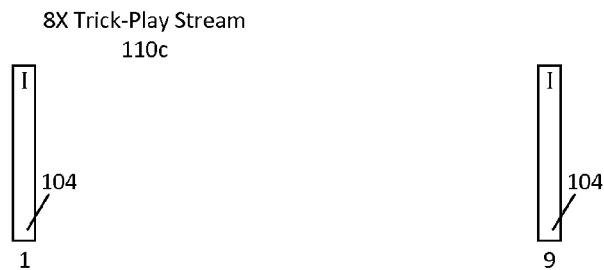
FIG. 1D depicts an embodiment of an 8× trick-play stream derived from the master trick-play stream of FIG. 1A.

To derive the trick-play stream 110 for a particular temporal resolution, the inter-coded frames 106 that are not needed to decode other inter-coded frames 106 at that temporal resolution can be dropped or skipped. The derived trick-play stream 110 can then be decoded and played back at the same frame rate as the master trick-play stream 100 to emulate playback of the media content at a different speed. As such, a k-fold speed trick-play stream 100 of "kx" speed can be derived by decoding every $k^{th}$ frame 102 starting from the leading I-frame 104 and skipping frames 102 between every $k^{th}$ frame 102. By way of non-limiting examples, FIG. 1B depicts frames 102 of a derived 2× trick-play stream 110a, FIG. 1C depicts frames 102 of a derived 4× trick-play stream 110b, and FIG. 1D depicts frames 102 of a derived 8× trick-play stream 110c. Because the decoding and playback of these trick-play streams 110 can occur at the same frame rate as the master trick-play stream 100, computational loads and bandwidth usage can be substantially similar to decoding and playing back the media content at regular non-trick-play speeds.

FIG. 1B depicts a portion of a 2× trick-play stream 110a derived from the master trick-play stream 100 shown in FIG. 1A. The 2× trick-play stream 110a can be derived by dropping or skipping the second, fourth, sixth, and eighth frame 102 in each GOP 108. Because those frames 102 are P-frames 106 that no other P-frame 106 in the GOP 108 relies on to be decoded, they can be skipped or dropped to serve a client device with a trick-play stream 110 that includes half the number of frames 102 as the master trick-play stream 100. When the 2× trick-play stream 110a is decoded and played back at the same frame rate as the master trick-play stream 100, it will appear to a viewer that the media content is being played twice as fast as normal because every other frame 102 is being decoded, with the intervening frames 102 being dropped or skipped. By way of a non-limiting example, if it would take one second to decode every frame 102 from frame 1 through frame 16 in the master trick-play stream 100, the decoder could decode every other frame 102 from frame 1 through frame 32 in the 2× trick-play stream 110a in one second, and thereby progress twice as far through the media content in the same time span. Additionally, because frames 102 are dropped or skipped at consistent intervals, viewers can perceive smooth motion in the media content playback even though it has been sped up.

FIG. 1C depicts a portion of a 4× trick-play stream 110b derived from the master trick-play stream 100 shown in FIG. 1A. The 4× trick-play stream 110b can be derived by dropping or skipping the third and seventh frame 102 in each GOP 108 in addition to the frames 102 dropped or skipped for the 2× trick-play stream 110a, such that only the first and fifth frames 102 need to be decoded. As shown in FIG. 1A, the fourth and eighth frames 102 depend from the third and seventh frames 102 in each GOP 108. However, because the fourth and eighth frames 102 do not need to be decoded at speeds of 2× or above, at the higher speed of 4× the third and seventh frames 102 can also be dropped or skipped because they do not have any dependent frames 102 that need to be decoded for playback at 4× speed. When the 4× trick-play stream 110b is decoded and played back at the same frame rate as the master trick-play stream 100, it will appear to a viewer that the media content is being played four times as fast as normal because every fourth frame 102 is being decoded, with the intervening three frames 102 being dropped or skipped. By way of a non-limiting example, if it would take one second to decode every frame 102 from frame 1 through frame 16 in the master trick-play stream 100, the decoder could decode every fourth frame 102 from frame 1 through frame 64 in the 4× trick-play stream 110b in one second, and thereby progress four times as far through the media content in the same time span. Additionally, because frames 102 are dropped or skipped at consistent intervals, viewers can perceive smooth motion in the media content playback even though it has been sped up.

FIG. 1D depicts a portion of an 8× trick-play stream 110c derived from the master trick-play stream 100 shown in FIG. 1A. The 8× trick-play stream 110c can be derived by dropping or skipping the fifth frame 102 in each GOP 108 in addition to the frames 102 dropped or skipped for the 2× trick-play stream 110a and the 4× trick-play stream 110b, such that only the first frame 102 needs to be decoded. As shown in FIG. 1A, the sixth and seventh frames 102 depend from the fifth frame 102 in each GOP 108. However, because the sixth frame 102 does not need to be decoded at speeds of 2× or above, and the seventh frame 102 does not need to be decoded at speeds of 4× or above, at the higher speed of 8× the fifth frame 102 can be dropped or skipped because it does not have any dependent frames 102 that need to be decoded for playback at 8× speed. When the 8× trick-play stream 110c is decoded and played back at the same frame rate as the master trick-play stream 100, it will appear to a viewer that the media content is being played eight times as fast as normal because every eighth frame 102 is being decoded, with the intervening seven frames 102 being dropped or skipped. By way of a non-limiting example, if it would take one second to decode every frame 102 from frame 1 through frame 16 in the master trick-play stream 100, the decoder could decode every eighth frame 102 from frame 1 through frame 128 in the 8× trick-play stream 110c in one second, and thereby progress eight times as far through the media content in the same time span. Additionally, because frames 102 are dropped or skipped at consistent intervals, viewers can perceive smooth motion in the media content playback even though it has been sped up.

Figure 2:
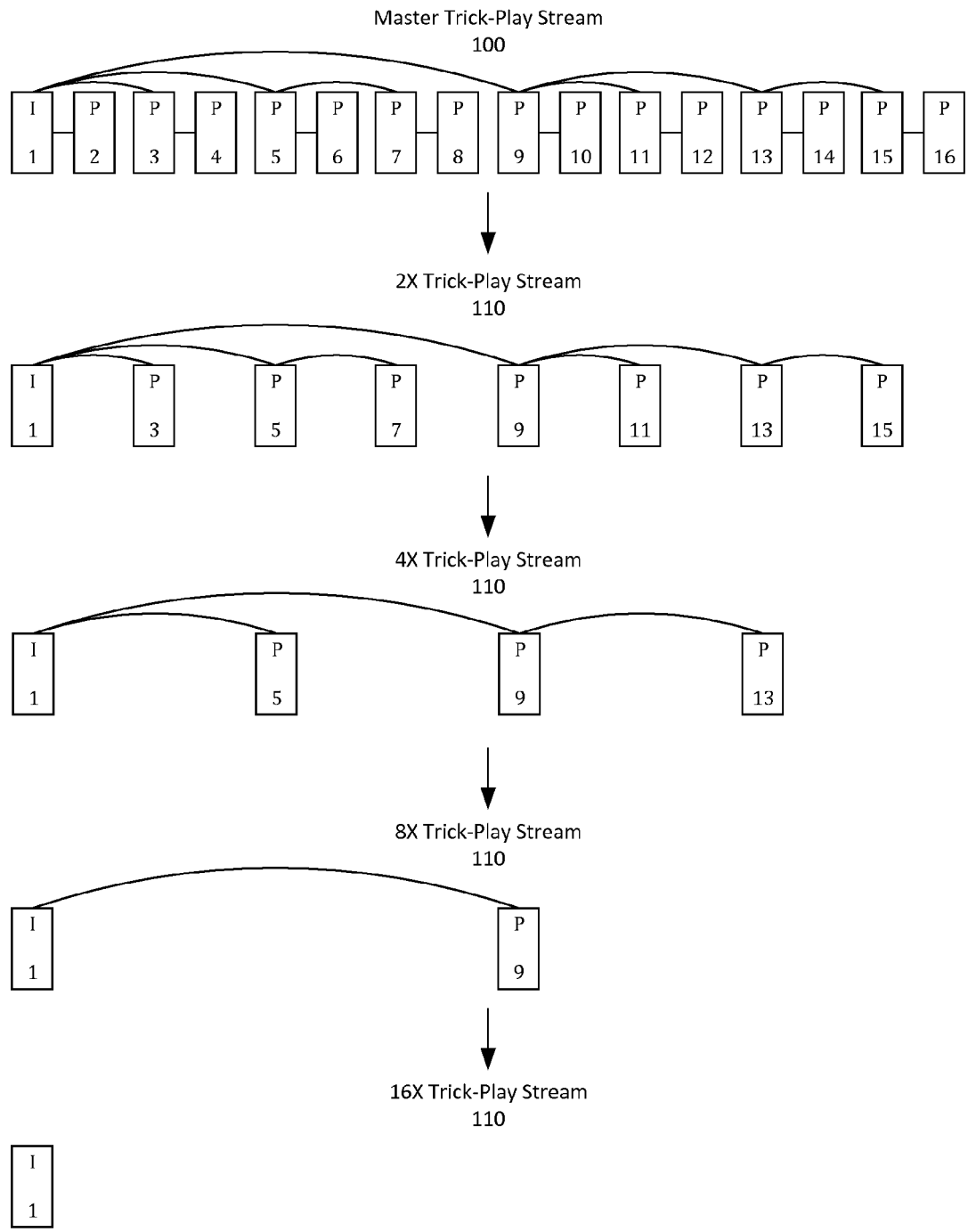
FIG. 2 depicts a second exemplary embodiment of a master trick-play stream encoded with a temporally scalable hierarchical relationship, and exemplary embodiments of a 2× trick-play stream derived from it, a 4× trick-play stream derived from it, an 8× trick-play stream derived from it, and a 16× trick-play stream derived from it.
Figure 3:
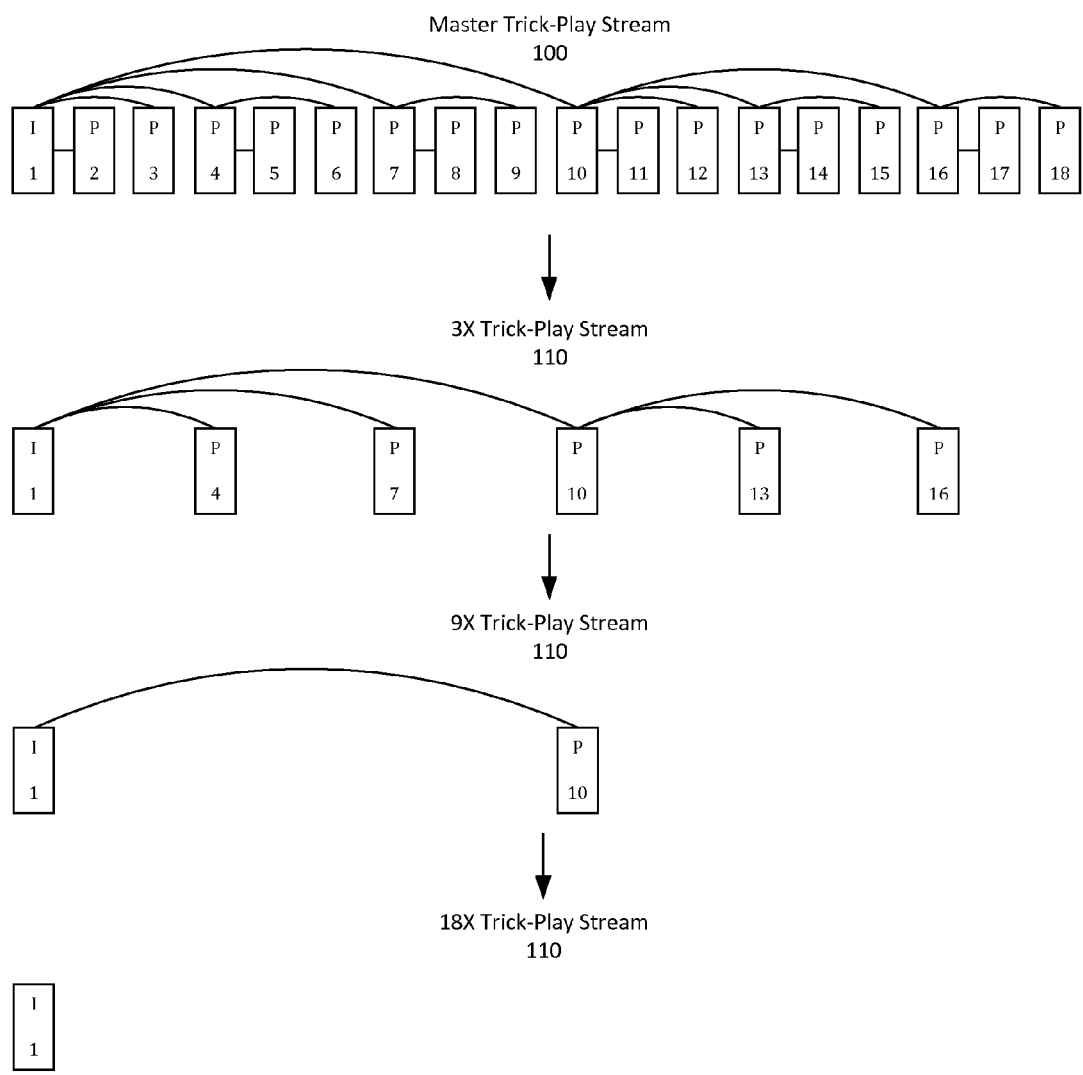
FIG. 3 depicts a third exemplary embodiment of a master trick-play stream encoded with a temporally scalable hierarchical relationship, and exemplary embodiments of a 3× trick-play stream derived from it, a 9× trick-play stream derived from it, and an 18× trick-play stream derived from it.
Figure 4:
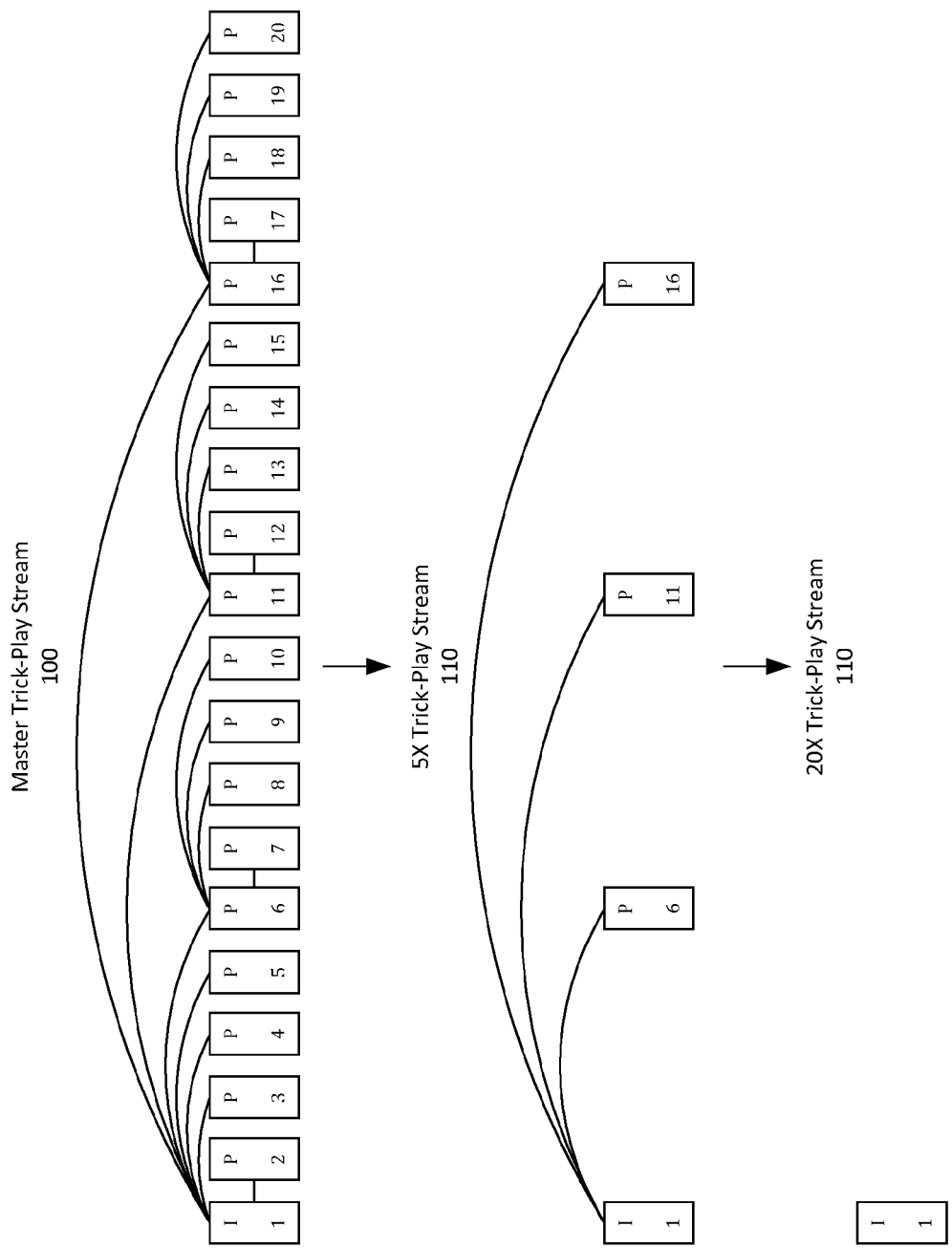
FIG. 4 depicts a fourth exemplary embodiment of a master trick-play stream encoded with a temporally scalable hierarchical relationship, and exemplary embodiments of a 5× trick-play stream derived from it and a 20× trick-play stream derived from it.

While FIG. 1A depicts one example of a temporally scalable hierarchical relationship that can be used to encode the frames 102 of a master trick-play stream 100, encoding each GOP 108 of a master trick-play stream 100 with other temporally scalable hierarchical relationships and prediction structures is possible when the hierarchical relationship between the I-frame 104 and the inter-coded frames 106 in the GOP 108 allows the inter-coded frames 106 that are not needed to decode other inter-coded frames 106 at a certain temporal resolution to be dropped or skipped when deriving a trick-play stream 110 for that temporal resolution. By way of a non-limiting example, FIG. 2 depicts a second exemplary temporally scalable hierarchical relationship that can be used to code a GOP 108 of sixteen frames 102 to derive trick-play streams 110 for 2× speed, 4× speed, 8× speed, and 16× speed. As can be seen from FIGS. 1A and 2, the encoding relationship shown in FIG. 2 is similar to the encoding relationship shown in FIG. 1A, except that the ninth frame 102 is a P-frame 106 encoded with reference to the GOP's I-frame 104 instead of being an I-frame 104 for the next GOP 108. As such, hierarchical encoding relationship similar to those shown in FIGS. 1A and 2 can be used for GOPs 108 having multiples of eight frames, by making the first of each subsequent group of eight frames an inter-coded frame 106 encoded with reference to the first frame 102 in the GOP 108. FIG. 3 depicts a third exemplary temporally scalable hierarchical relationship in which a GOP 108 of eighteen frames 102 can be encoded such that inter-coded frames 106 without dependent inter-coded frames 106 can be dropped or skipped to derive trick-play streams 110 for 3× speed, 9× speed, and 18× speed. Similarly, FIG. 4 depicts a fourth exemplary temporally scalable hierarchical relationship in which a GOP 108 of twenty frames 102 can be encoded such that inter-coded frames 106 without dependent inter-coded frames 106 can be dropped or skipped to derive trick-play streams 110 for 5× speed and 20× speed.

Figure 5:
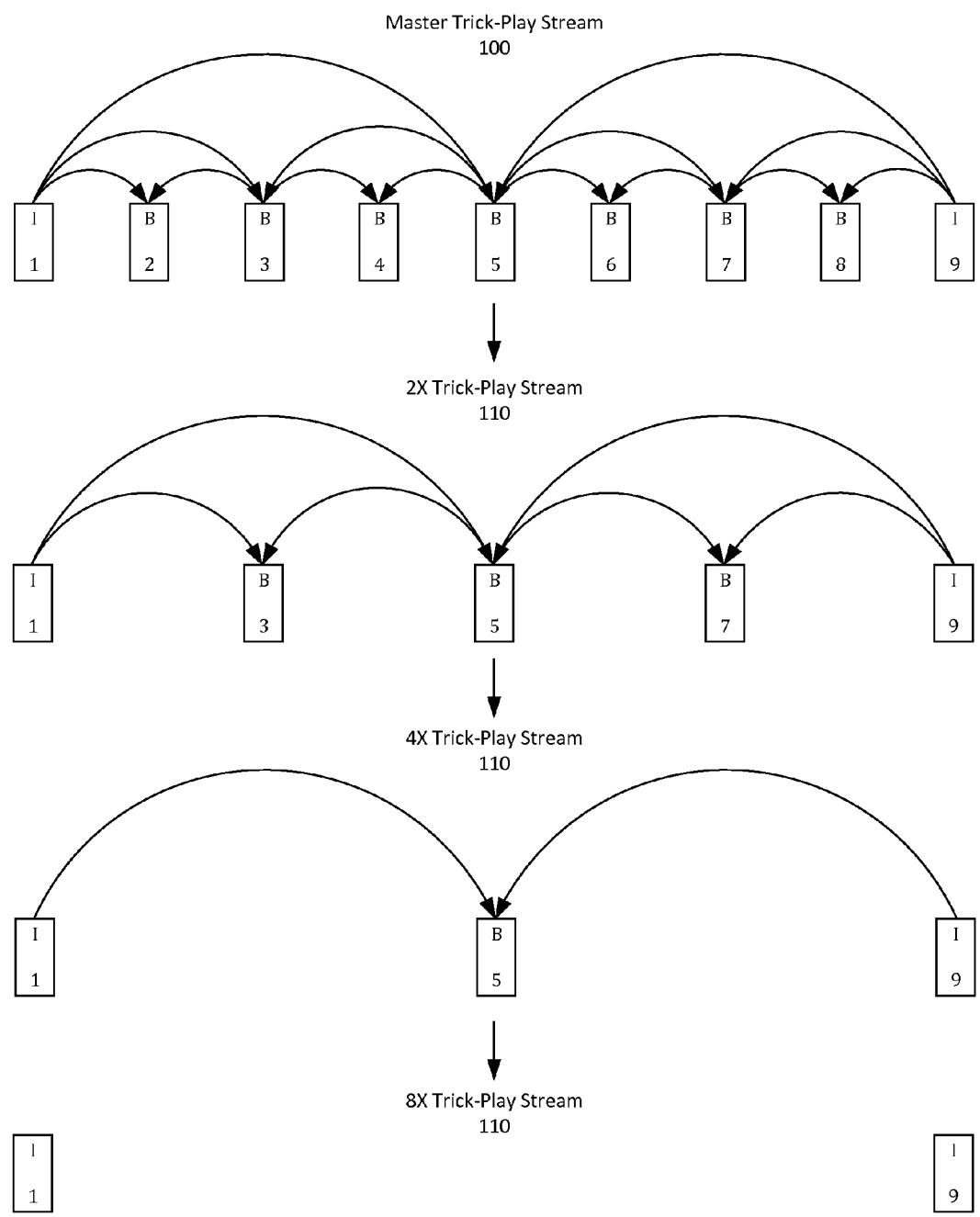
FIG. 5 depicts a fifth exemplary embodiment of a master trick-play stream encoded with a temporally scalable hierarchical relationship, and exemplary embodiments of a 2× trick-play stream derived from it, a 4× trick-play stream derived from it, and an 8× trick-play stream derived from it.
Figure 6:
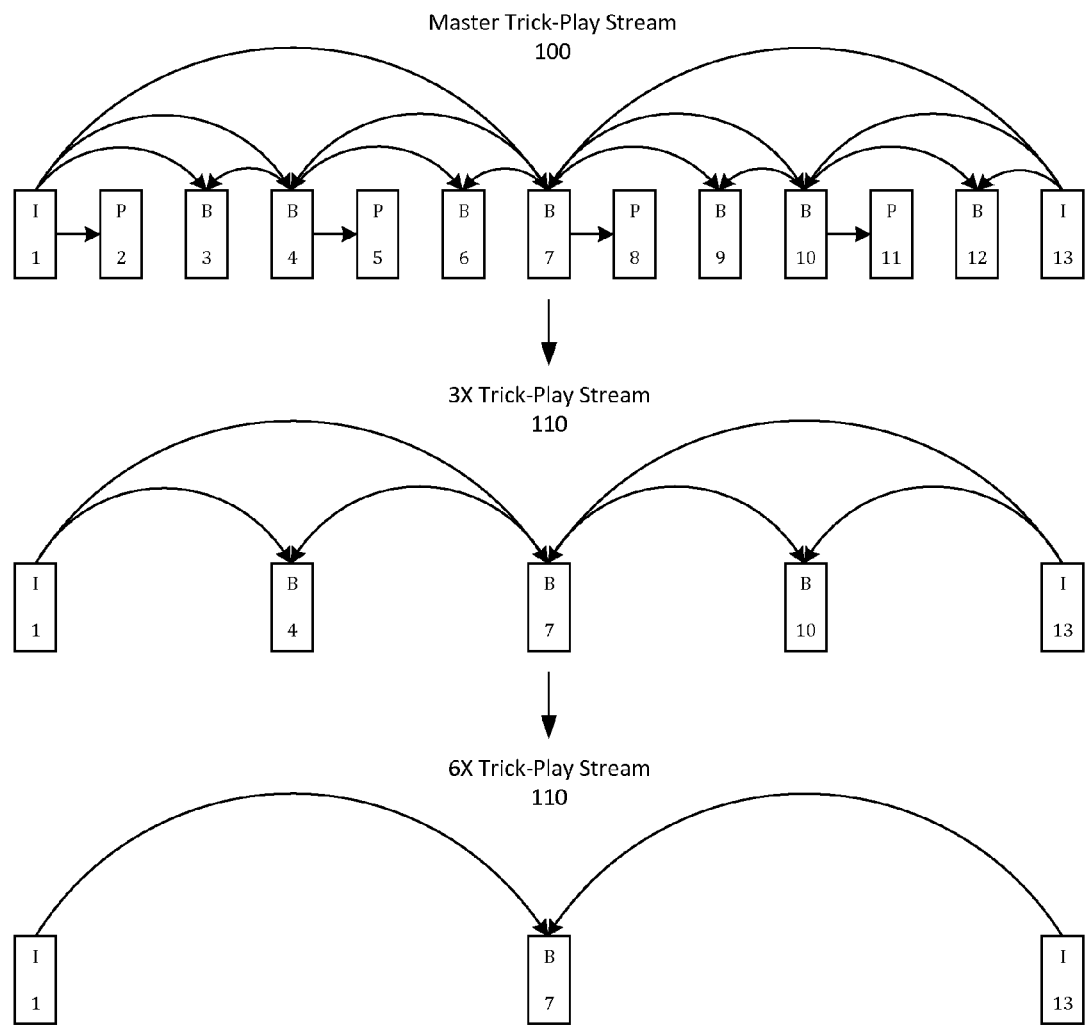
FIG. 6 depicts a sixth exemplary embodiment of a master trick-play stream encoded with a temporally scalable hierarchical relationship, and exemplary embodiments of a 3× trick-play stream derived from it and a 6× trick-play stream derived from it.

While the exemplary embodiments of temporally scalable hierarchical relationship shown in FIGS. 1-4 use I-frames 104 and P-frames 106, the temporally scalable hierarchical relationship can also use I-frames 104 and B-frames 106, or a combination of I-frames 104, P-frames 106, and B-frames. By way of a non-limiting example, FIG. 5 depicts a fifth exemplary temporally scalable hierarchical relationship in which a temporally scalable hierarchical relationship is used to encode a master trick-play stream 100 including I-frames 104 and inter-coded B-frames 106 encoded with reference to previous and/or subsequent frames 102, such that inter-coded frames 106 without dependent inter-coded frames 106 can be dropped or skipped to derive trick-play streams 110 for 2× speed, 4× speed, and 8× speed. As another non-limiting example, FIG. 6 depicts a sixth exemplary temporally scalable hierarchical relationship in which a temporally scalable hierarchical relationship is used to encode a master trick-play stream 100 including I-frames 104, inter-coded P frames 106 encode with reference to previous frames, and inter-coded B-frames 106 encoded with reference to previous and/or subsequent frames 102, such that inter-coded frames 106 without dependent inter-coded frames 106 can be dropped or skipped to derive trick-play streams 110 for 3× speed and 6× speed. While the temporally scalable hierarchical relationship used to encode a master trick-play stream 100 allows specific inter-coded frames 106 to be dropped or skipped until only the leading I-frame 104 in each GOP 108 is left, in some embodiments even faster trick-play streams 110 can be derived by further skipping the leading I-frames 104 in certain patterns of GOPs 108. By way of a non-limiting example, in the temporally scalable hierarchical relationship shown in FIG. 1A, the 8× trick-play stream 110 can be derived by dropping or skipping all inter-coded frames 106 in each GOP 108, such that the leading I-frame 104 in each GOP 108 is sent to a client device's decoder. However, in some embodiments faster trick-play streams 110 can be derived by further skipping the I-frames 104 in a consistent pattern of GOPs 108. By way of a non-limiting example, in some embodiment a 16× trick-play stream 110 can be derived from the master trick-play stream 100 shown in FIG. 1A by extracting the leading I-frames 104 from every other GOP 108, a 32× trick-play stream 110 can be derived by extracting the leading I-frames 104 from every fourth GOP 108, and further trick-play streams 110 can be similarly derived by extracting leading I-frames 104 from GOPs 108 at any other consistent interval.

In some embodiments, the master trick-play stream 100 can be encoded from a regular speed version of media content, such that faster than normal trick-play streams 110 can be derived from the master trick-play stream 100, as described above. In other embodiments, the master trick-play stream 100 can be encoded from a different version of the media content, such as version that has already at a different speed. By way of a non-limiting example, when the master trick-play stream 100 is encoded using the hierarchical relationship shown in FIG. 1A from a 2× speed version of media content, all frames 102 of the master trick-play stream 100 can be decoded and played back at normal speed to present what would be perceived as 2× speed playback, the every other frame 102 pattern shown in FIG. 1B can be used to derive what would be perceived as a 4× speed trick-play stream 110, the every fourth frame 102 pattern shown in FIG. 1C can be used to derive what would be perceived as an 8× speed trick-play stream 110, and the every eighth frame 102 pattern shown in FIG. 1D can be used to derive what would be perceived as a 16× speed trick-play stream 110.

Choice of the specific temporally scalable hierarchical relationship and appropriate prediction structure to be used when generating a master-trick play stream 100, such as whether inter-coded frames 106 to be used include either or both P-frames and B-frames, can be made depending on factors such as design considerations of compression efficiency and structural delay between encoding and decoding. For instance, structural delay can impact latency in responding to trick-play requests from a client under some conditions.

Figure 7:
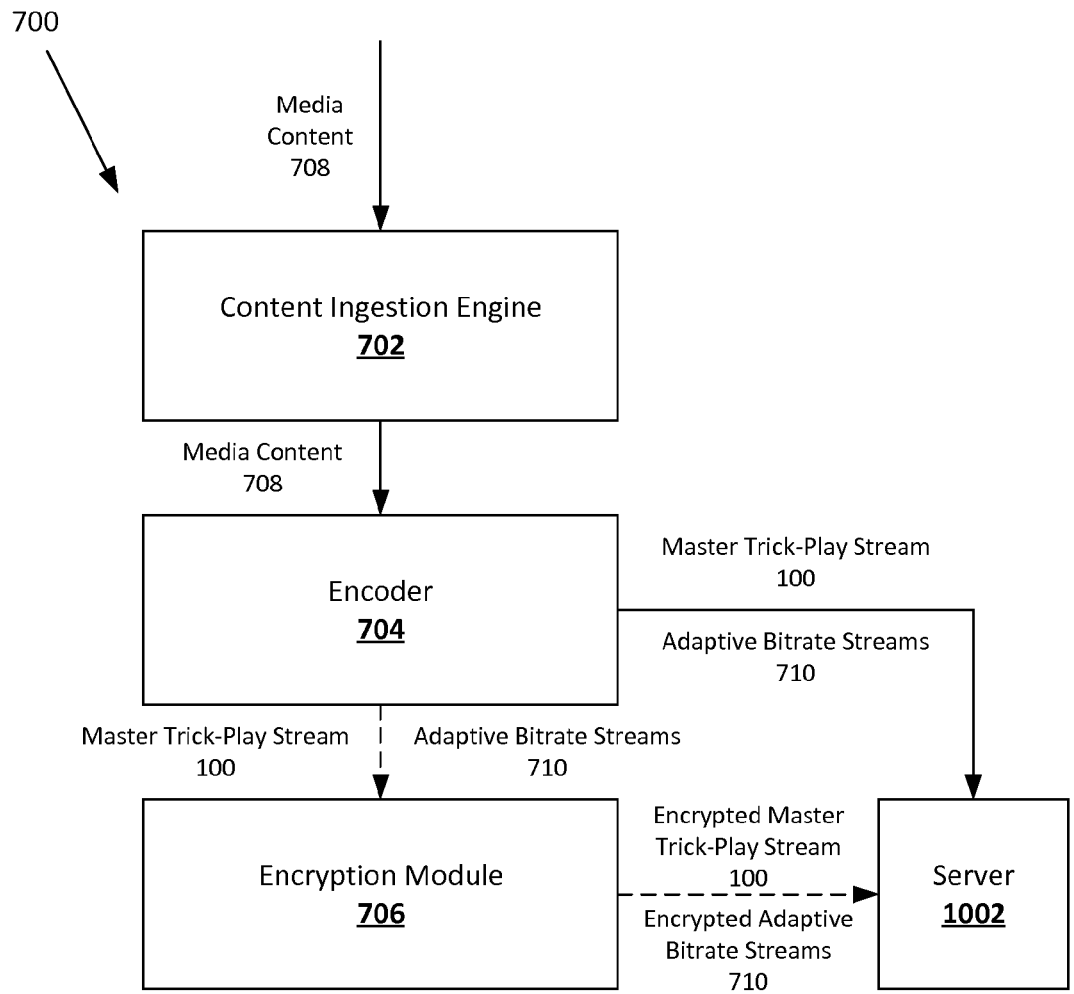
FIG. 7 depicts an exemplary embodiment of an encoding system for creating a master trick-play stream.

FIG. 7 depicts an exemplary embodiment of an encoding system 700 for creating a master trick-play stream 100. The encoding system 700 can comprise a content ingestion engine 702 and an encoder 704. In some embodiments the encoding system 700 can further comprise an encryption module 706. In some embodiments the components of the encoding system 700 can be in a single unit, while in other embodiments some or all components of the encoding system 700 can be in different units.

The content ingestion engine 702 can receive media content 708 from an outside source. By way of non-limiting examples, the content ingestion engine 702 can receive a piece of media content 708 as a live broadcast feed, as video on demand, as video mastered by a production house, or in any other format from any other source. The content ingestion engine 702 can pass the received media content 708 to the encoder 704.

Figure 8:
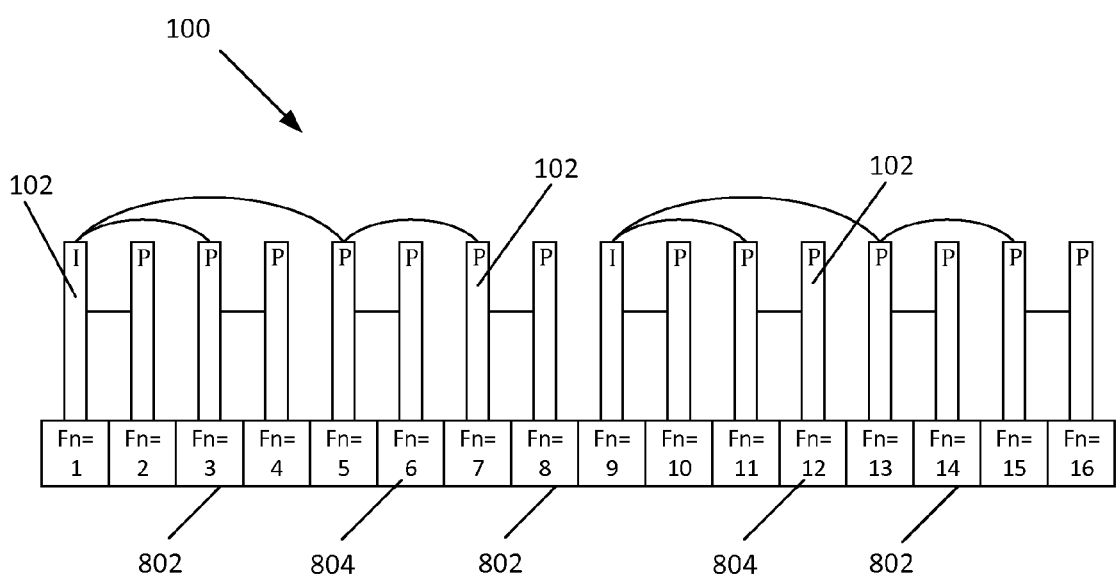
FIG. 8 depicts an exemplary embodiment of frames from a master trick-play stream encoded with slice headers.
Figure 9:
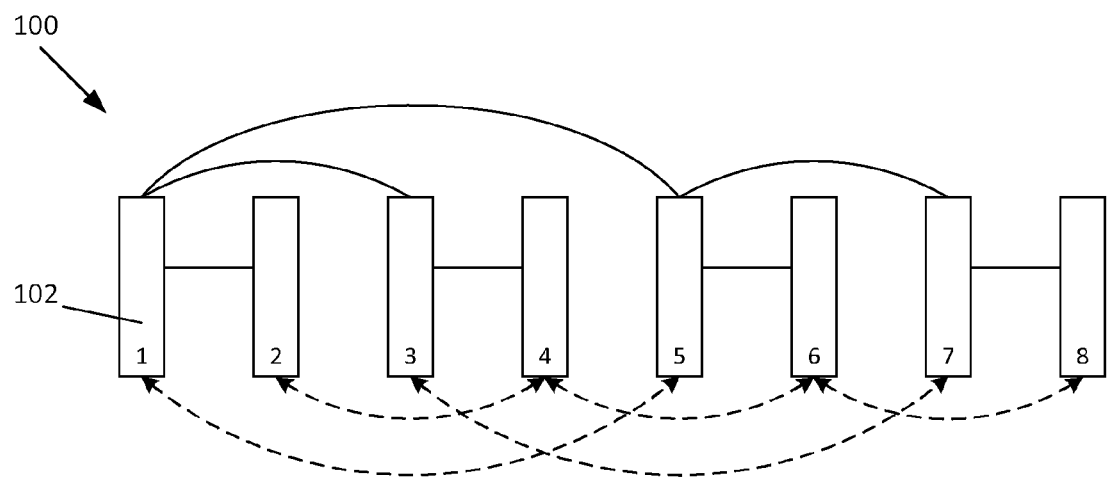
FIG. 9 depicts an exemplary encryption relationship that can be used to encode frames of a master trick-play stream.

The encoder 704 can comprise a video and/or audio encoder configured to transcode and/or chunk received media content 708. By way of a non-limiting example, the encoder 704 can be an H.264 MPEG-4 Advanced Video Coding (AVC) encoder. The encoder 704 can encode the received media content 708 into a master trick-play stream 100 with frames encoded with a temporally scalable hierarchical relationship, as described above. In some embodiments, each individual frame 102 can be encoded as an individual slice, and the encoder 704 can accordingly generate a slice header 802 for each frame 102, as shown in FIG. 8. The slice header 802 can include a frame number 804 associated with the slice. The frame numbers 804 can indicate to a decoder the display order of the frames 102. By way of a non-limiting example, in some situations a decoder can receive and/or decode frames 102 out of order, but place decoded frames 102 in a buffer such that they can be displayed from the buffer in the intended display order according to the frame numbers 804 in the slice headers.

In some embodiments the encoder 704 can also encode the media content 708 into one or more non-trick-play adaptive bitrate streams 710. By way of a non-limiting example, in addition to encoding the master trick-play stream 100, the encoder 704 can also encode the media content 708 into a low resolution version, a medium resolution version, and a high resolution version, each suitable for playback at regular speed instead of in a trick mode. In alternate embodiments, non-trick-play adaptive bitrate streams 710 can be encoded by a different encoder.

The encoder 704 can also divide the master trick-play stream 100 and/or any other adaptive bitrate streams 710 into chunks. In some embodiments the encoder 704 can encrypt the master trick-play stream 100 with the encryption module 706, as will be described below, and then pass the encrypted master trick-play stream 100 to a server 1002 or other network element. In other embodiments the encoder 704 can pass the unencrypted master trick-play stream 100 to a server 1002 or network element.

In some embodiments in which the encoder 704 encodes non-trick-play adaptive bitrate streams 710 in addition to the master trick-play stream 100, the encoder 704 can encode aspects of the non-trick-play adaptive bitrate streams 710 based on encoding of the master trick-play stream 100. By way of a non-limiting example, when the master trick-play stream 100 is encoded with GOPs 108 of 32 frames, the encoder 704 can set the frequency of Instantaneous Decoder Refresh (IDR) frames within the non-trick-play adaptive bitrate streams 710 such that their IRD periodicity is a multiple of 32, for instance 320 frames. In this example, because each chunk begins with an IDR frame and would span 320 frames, the encoder 704 can set the chunk size to be 10.6667 when the frame rate is 30 frames per second (320 frames/30 frames per second). As such, in some embodiments when there is an integral number of GOPs 108 per chunk in non-trick-play adaptive bitrate streams 710, playback can transition smoothly between non-trick-play adaptive bitrate streams 710 and trick-play steams 110 at the borders of GOPs 108. In alternate embodiments the encoder 704 or different encoders can encode the non-trick-play adaptive bitrate streams 710 independently from how the master trick-play stream 100 is encoded.

As indicated above, in some embodiments the encoding system 700 can encrypt the master trick-play stream 100 with an encryption module 706 after it has been encoded. In some embodiments, the encryption module 706 can independently encrypt each frame 102 of the master trick-play stream 100. As such, when certain frames 102 are dropped or skipped to derive trick-play streams 110 from the master trick-play stream 100 for different temporal resolutions as will be described below, each frame 102 used in the derived trick-play streams 110 can have been independently encrypted and can thus be independently decrypted without dependence to other frames 102 in the master trick-play stream 100 that may or may not have been included in the derived trick-play streams 110 at the selected temporal resolution.

However, in other embodiments the encryption module 706 can independently encrypt subsets of frames 102 from the master trick-play stream 100 according to identification of which frames 102 would be dropped or skipped to derive trick-play streams 110 at different temporal resolutions, as shown in FIG. 7. Subsets of frames 102 from the master trick-play stream 100 that would be dropped or skipped to derive trick-play streams 110 at each successively higher speed can be encrypted independently. In some embodiments, the frames 102 of each subset can be encrypted with a dependency relationship, such that encryption and/or decryption of one or more frames 102 in the subset depends on encryption and/or decryption of one or more other frames 102 in the subset.

By way of a non-limiting example, as described above the master trick-play stream 100 shown in FIG. 1A can be used to derive a 2× trick-play stream 110 by dropping or skipping the second, fourth, sixth, and eighth frames 102 of each GOP 108, as shown in FIG. 1B. As such, the second, fourth, sixth, and eighth frames 102 of each GOP 108 can be encrypted with dependence on one another, as shown in FIG. 7. Because encryption and decryption of this subset of frames 102 can depend on encryption and decryption of one or more other frames 102 in the subset, and not on other frames 102 in the master trick-play stream 100, when the subset is dropped or skipped for trick-play streams 110 of 2× speeds or higher, the absence of the frames 102 in the subset in the derived trick-play stream 110 can avoid impacting encryption and decryption of the derived trick-play stream 110. Similarly, the third and seventh frames in each GOP 108 in the master trick-play stream 100 of FIG. 1A can be dropped or skipped in addition to second, fourth, sixth, and eighth frames 102 to derive a 4× trick-play stream 110 as shown in FIG. 1C, so the subset including the third and seventh frames in each GOP 108 can be independently encrypted. Similarly, the first and fifth frames in each GOP 108 that remain when deriving a 4× trick-play stream 110 from the master trick-play stream 100 of FIG. 1A can be independently encrypted with dependence on one another.

In alternate embodiments, some or all portions of a master trick-play stream 100 can be left unencrypted and can be transferred to client devices in the clear. By way of a non-limiting example, in some embodiments a low resolution version of a master trick-play stream 100 can be transferred to client devices in the clear, serving as a teaser or advertisement for an encrypted but higher resolution version that can be purchased or rented.

Figure 10:
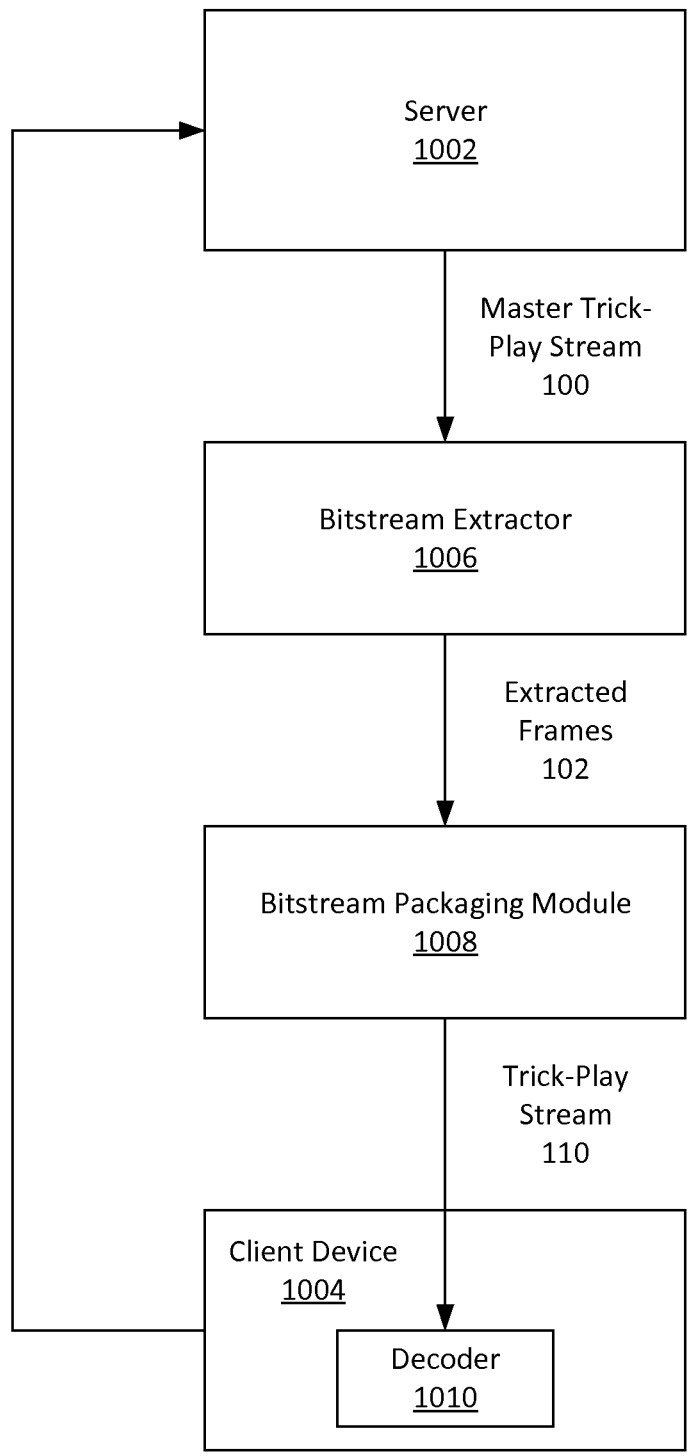
FIG. 10 depicts an exemplary embodiment of a content delivery system for delivering trick-play streams from a server to a client device.

FIG. 10 depicts an exemplary embodiment of a content delivery system 1000 for delivering trick-play streams 110 from a server 1002 to a client device 1004. The content delivery system 1000 can comprise a server 1002, a client device 1004, a bitstream extractor 1006 and/or a bitstream packaging module 1008. In some embodiments the bitstream extractor 1006 and/or bitstream packaging module 1008 can be located at the server 1002. In other embodiments the bitstream extractor 1006 and/or bitstream packaging module 1008 can be located at the client device 1004. In still other embodiments, the bitstream extractor 1006 and/or bitstream packaging module 1008 can be located at an intermediate media-aware network element (MANE) between the server 1002 and client device 1004. In yet other embodiments, a MANE or any other network element can take the place of the server 1002 in FIG. 10 and in the description below. By way of a non-limiting example, a MANE can store a master trick-play stream 100 and be in communication with a bitstream extractor 1006, a bitstream packaging module 1008, and/or a client device 1004, similar to the server 1002 described below.

The server 1002 can be an adaptive streaming server configured to store a master trick-play stream 100 encoded from a piece of media content 708 and one or more other non-trick-play adaptive bitrate streams 710 generated from the same piece of media content 708. By way of a non-limiting example, the server 1002 can receive a master trick-play stream 100 from the encoding system 700, and other associated adaptive bitrate streams 710 from the same encoding system 700 or other encoders. As indicated above, in alternate embodiments the server 1002 can be replaced by any other network element, such as a MANE, that can store and/or deliver media streams to other elements on a network.

The client device 1004 can be a set-top box, computer, smartphone, mobile device, tablet computer, gaming console, or any other device configured to request, receive, and play back media content streams. The client device 1004 can comprise a decoder 1010 configured to decode encoded media content streams. By way of a non-limiting example, the decoder 1010 can be a standards compliant H.264 decoder.

The bitstream extractor 1006 can be configured to extract some or all frames 102 from the master trick-play stream 100 stored at the server 1002 or other network element. By way of a non-limiting example, the bitstream extractor 1006 can extract every frame 102 from the master trick-play stream 100 shown in FIG. 1A when the client device has requested normal speed playback, extract every other frame 102 from the master trick-play stream 100 shown in FIG. 1A when the client device 404 has requested 2× speed playback as described above with respect to FIG. 1B, extract every fourth frame 102 from the master trick-play stream 100 shown in FIG. 1A when the client device 404 has requested 4× speed playback as described above with respect to FIG. 1C, and extract every eighth frame 102 from the master trick-play stream 100 shown in FIG. 1A when the client device 404 has requested 8× speed playback as described above with respect to FIG. 1D. In some embodiments, the bitstream extractor 1006 can create and/or maintain an index file for each temporal resolution indicating the starting position for consecutive frames for the associated temporal resolution.

The bitstream packaging module 1008 can be configured to repackage the frames 102 extracted by the bitstream extractor 1006 into a packaged trick-play stream 110 in a format readable and decodable by the client device's decoder 1010, as will be discussed in more detail below. As such, in some embodiments the client device's decoder 1010 can be a standard decoder that has not been modified in order to decode trick-play streams 110 and can decode the repackaged trick-play stream 110 as if it were any other type of stream such as a non-trick-play adaptive bitrate stream 710.

Figure 11:
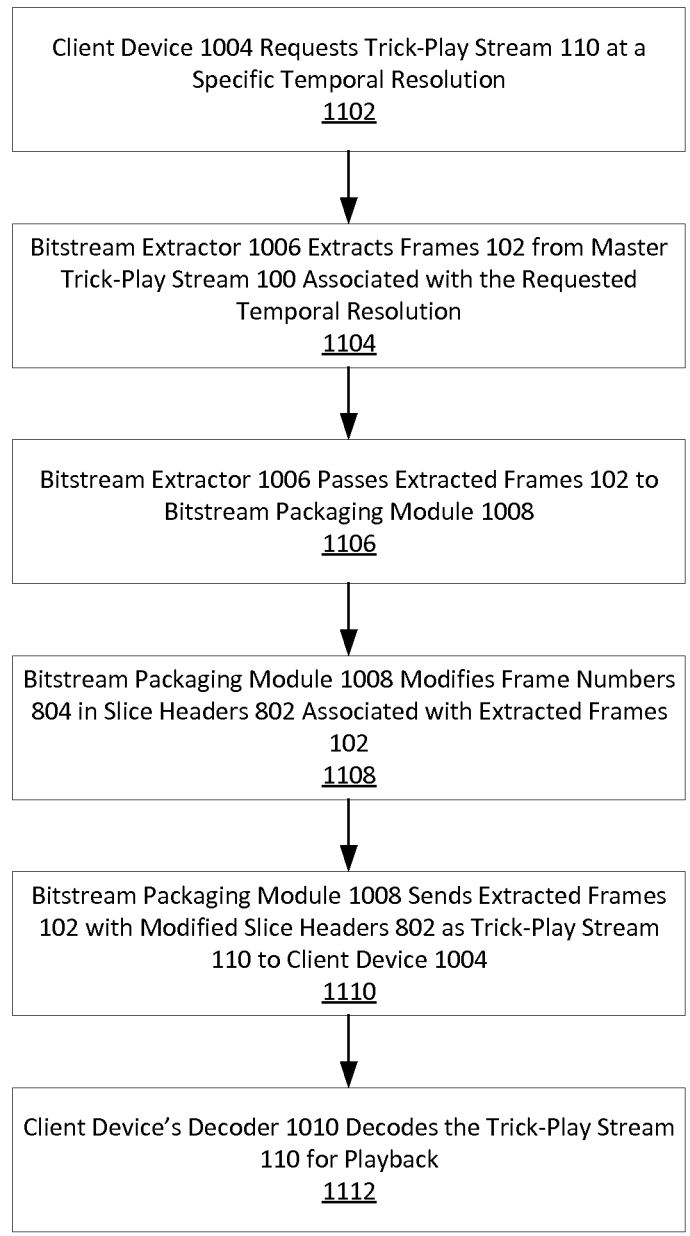
FIG. 11 depicts a first method for delivering trick-play streams derived from a master trick-play stream from a server to a client device.

FIG. 11 depicts a first method for delivering trick-play streams 110 derived from a master trick-play stream 100 from a server 1002 or other network element to a client device 1004. In this method, the bitstream packaging module 1008 can modify the slice headers 802 of frames 102 extracted from the master trick-play stream 100.

At step 1102, the client device 1004 can request a trick-play stream 110 corresponding to a specific temporal resolution. The client device 1004 can request that the trick-play stream 110 begin playback at the client device's current position within media content playback.

At step 1104, the bitstream extractor 1006 can extract frames 102 from the master trick-play stream 100 stored on the server 1002 or other network element that are associated with the requested temporal resolution. In some embodiments, the bitstream extractor 1006 can extract frames 102 from the point in the media content 708 at which the trick-play request was received. By way of a non-limiting example, if a client device 1004 requests a 2× speed trick-play stream 110 after playing 15 minutes of a movie as non-trick-play adaptive bitrate streams 710, the bitstream extractor 1006 can begin extracting frames 102 from GOPs 108 in the master trick-play stream 100 starting at the 15 minute mark, such that viewers can perceive a smooth transition from regular speed playback to a fast-forwarded version. The bitstream extractor 1006 can pass the extracted frames 102 to the bitstream packaging module 1008 at step 1106.

At step 1108, if not all frames 102 were extracted from the master trick-play stream 100, the bitstream packaging module 1008 can modify the slice headers 802 associated with the extracted frames 102 by renumbering the frame numbers 804 in the slice headers 802 to eliminate gaps in the frame number sequence due to the absence of frames 102 that were not extracted. By way of a non-limiting example, as shown in FIG. 10, the bitstream packaging module 1008 can modify the slice headers 802 for frames 102 extracted for 2× speed by editing the frame numbers 804 in the slice headers 802 such that gaps between the frame numbers 804 associated with consecutive extracted frames 102 are eliminated. For instance, the bitstream packaging module 1008 can edit the slice headers 802 for the first four extracted frames 102 associated with a 2× trick-play stream 110 to change their frame numbers 804 from respectively reading 1, 3, 5, and 7 to instead read 1, 2, 3, and 4, and the remaining slice headers 802 for the extracted frames 102 can be similarly modified.

At step 1110, the bitstream packaging module 1008 can package the extracted frames 102 and their modified slice headers 802 into a packaged trick-play stream 110 readable by the decoder 1010 of a client device 1004. The bitstream packaging module 1008 can then send the packaged trick-play stream 110 to the requesting client device 1004.

At step 1112, the client device's decoder 1010 can decode the trick-play stream 110 and play back the media content 708. Because the bitstream packaging module 1008 modified the slice headers 802 of consecutive extracted frames 102 during step 1110 to include sequential frame numbers 804 and thereby eliminated gaps in the frame numbering sequence that would have otherwise been present due to the absence of frames 102 that were not extracted, the decoder 1010 can decode the packaged trick-play stream 110 normally as if it were any other type of stream.

Figure 13:
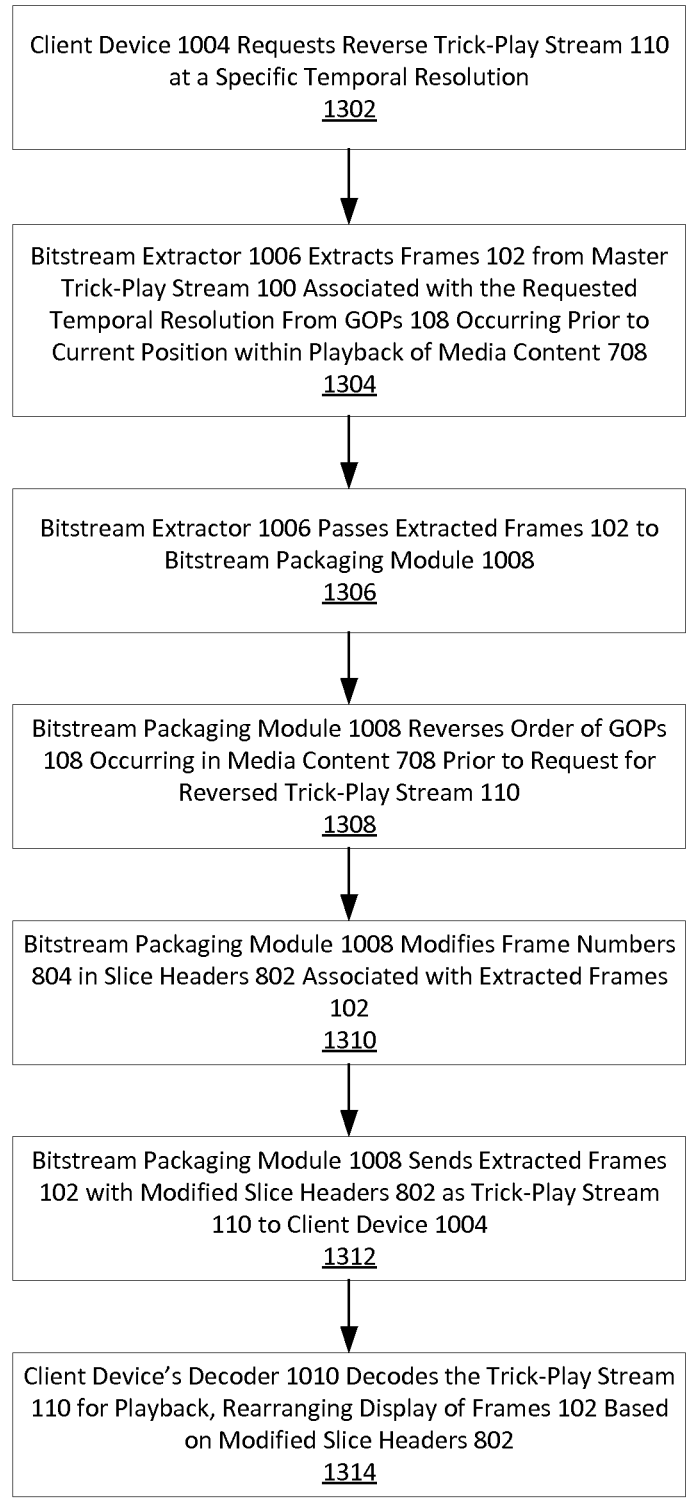
FIG. 13 depicts a process for delivering reversed media content via trick-play streams derived from a master trick-play stream.

In addition to preparing packaged trick-play streams 110 for different temporal resolutions, the content delivery system 1000 can also derive and prepare trick-play streams 110 for reverse playback at various temporal resolutions, which can be suitable for emulating rewinding media content 708. FIG. 13 depicts a process for delivering reversed media content 708 via trick-play streams 110 derived from a master trick-play stream 100.

At step 1302, the client device 1004 can request a reversed trick-play stream 110 at a specific temporal resolution. The client device 1004 can request that the reversed trick-play stream 110 begin playback at the client device's current position within media content playback. By way of a non-limiting example, the client device can have reached the five minute mark within a piece of media content either through normal speed playback or fast-forwarding to that mark through playback of other trick-play streams 110.

Figure 14A:
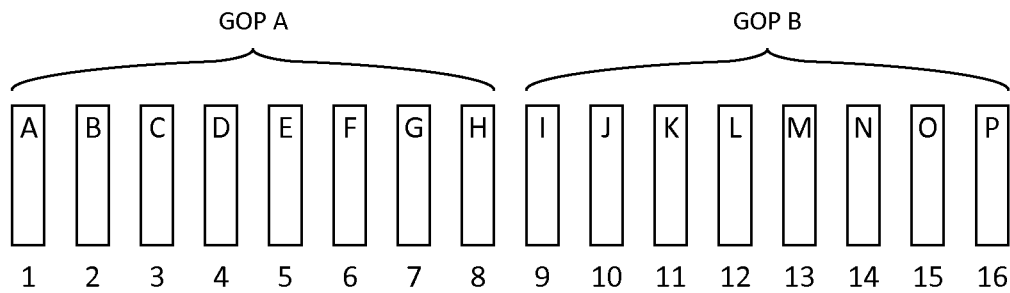
FIG. 14A depicts an example of frames extracted from the master trick-play stream 100 for reverse trick-mode playback according to the method of FIG. 13.

At step 1304, the bitstream extractor 1006 can extract frames 102 from the master trick-play stream 100 stored on the server 1002 or other network element that are associated with the requested temporal resolution. By way of a non-limiting example, FIG. 14A depicts frames 102 extracted by the bitstream extractor 1006 from the master trick-play stream 100 for reverse trick-mode playback at 1× speed. In other situations, the bitstream extractor 1006 can extract frames 102 from the master trick-play stream 100 for reverse playback at any other desired temporal resolution.

During step 1304, the bitstream extractor 1006 can extract frames 102 in GOPs 108 in the master trick-play stream 100 that occur prior to the point in the media content 708 at which the trick-play request was made. By way of a non-limiting example, if a client device 1004 requests a reversed trick-play stream 110 after reaching the twentieth GOP 108 either through normal or fast-forwarded playback, the bitstream extractor 1006 can begin extraction of frames 102 from the first through nineteenth GOP 108 in the master trick-play stream 100 as appropriate for the requested temporal resolution. The bitstream extractor 1006 can pass the extracted frames 102 to the bitstream packaging module 1008 at step 1306.

Figure 14B:
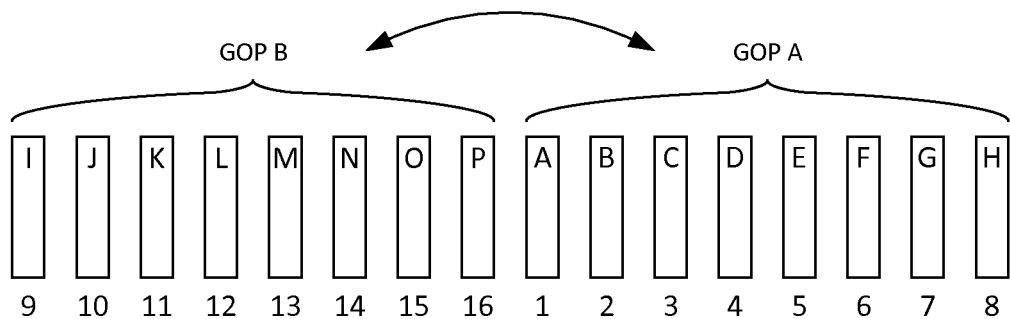
FIG. 14B depicts an example of the order of GOPs of extracted frames being reversed for reverse trick-mode playback according to the method of FIG. 13.

At step 1308, the bitstream packaging module 1008 can reverse the order of the GOPs 108 occurring prior to the position in the media content 708 at which the reverse trick-play was requested. As such, the sequence of GOPs 108 to be sent to the client device's decoder 1010 can be reversed from normal forward playback. By way of a non-limiting example, if the client device requested the reversed trick-play stream 110 after playing back frames 102 through the second GOP 108, the bitstream packaging module 1008 can reverse the order of the first two GOPs 108 of extracted frames 102, as shown in FIG. 14B.

Figure 14C:
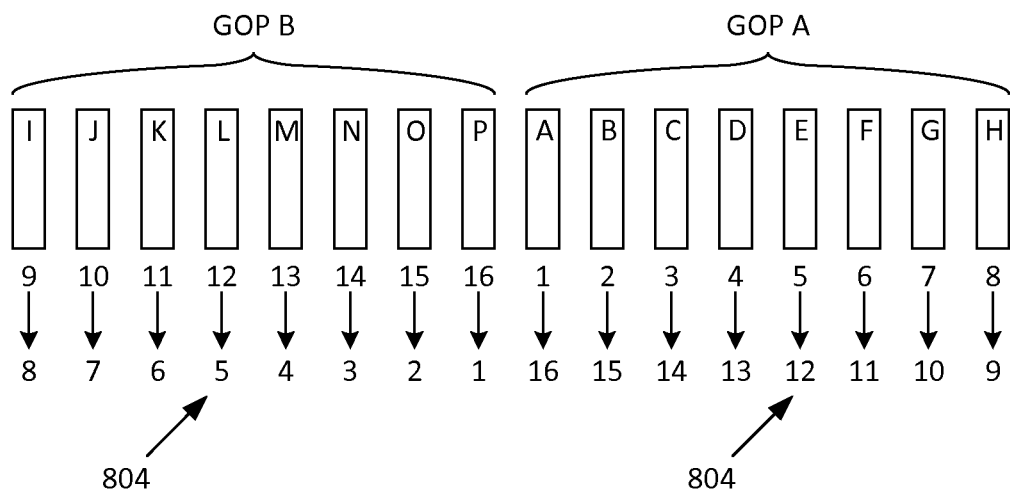
FIG. 14C depicts examples of modifications to slice headers according to the method of FIG. 13.

At step 1310, after the order of the GOPs 108 occurring before the rewind request point have been reversed, the bitstream packaging module 1008 can modify the slice headers 802 associated with each extracted frame 102 in each GOP 108 such that the frame numbers 804 in the slice headers 802 of the GOPs 108 occurring before the rewind request point are reversed, as shown in FIG. 14C. The slice headers 802 of GOPs 108 in the reversed order can be modified to include sets of frame numbers 804 that increment across the reverse order by the amount of frames 102 in the GOP 108, but are in descending order within each GOP 108. By way of a non-limiting example, the frame 102 that previously had the final frame number 804 in the sequence can be modified to have the first frame number 804, even if the final frame number 804 appears in an earlier GOP 108 due to the reversed order of the GOPs 108.

In some embodiments, when the extracted frames 102 are associated with a different temporal resolution than regular speed playback and gaps in the frame number sequence would otherwise appear in extracted frames 102 due to the absence of non-extracted frames 102, during step 1310 the bitstream packaging module 1008 can also modify the slice headers 802 of extracted frames 102 such that gaps between the frame numbers 804 associated with consecutive extracted frames 102 are eliminated.

At step 1312, the bitstream packaging module 1008 can package the extracted frames 102 and their modified slice headers 802 into a packaged trick-play stream 110 readable by the decoder 1010 of a client device 1004. The bitstream packaging module 1008 can then send the packaged trick-play stream 110 to the requesting client device 1004.

Figure 14D:
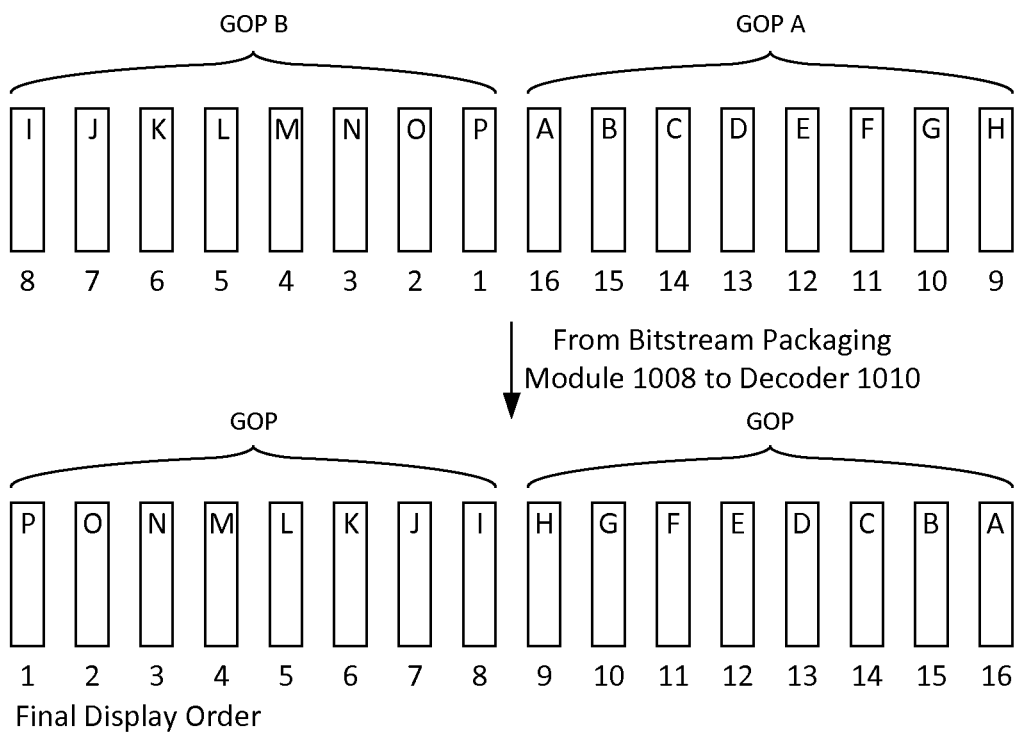
FIG. 14D depicts an example of a reversed trick-play stream being sent to a client device according to the method of FIG. 13.
Figure 14E:
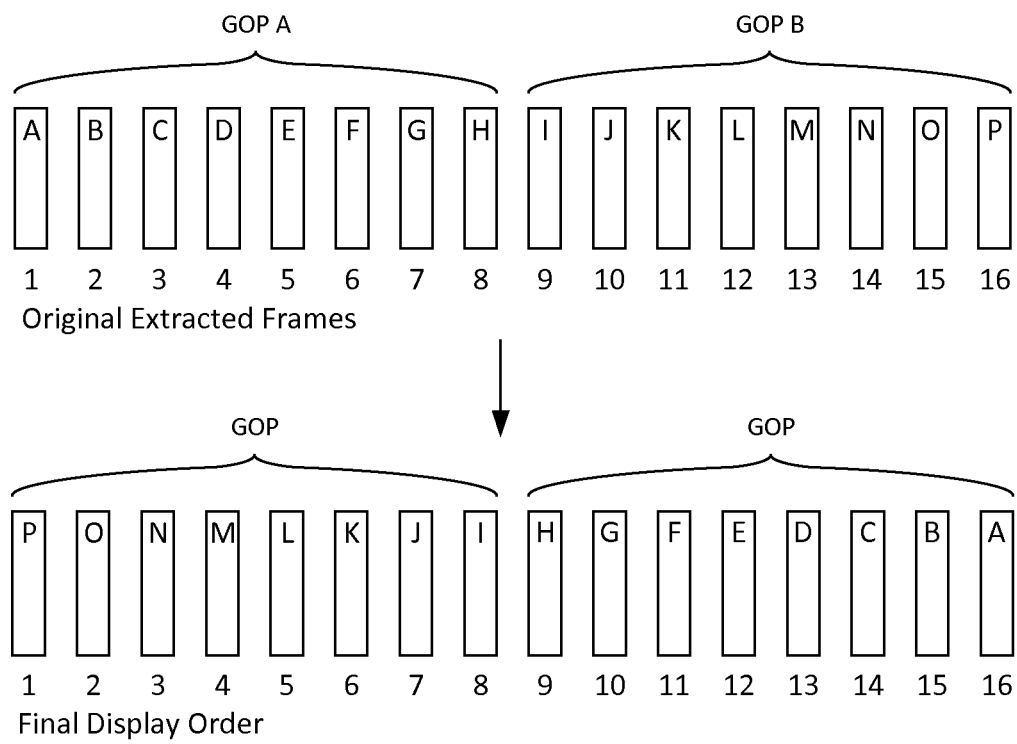
FIG. 14E an exemplary comparison between an original order of extracted frames and the final display order after modification for reverse trick-mode playback and decoding by a client device's decoder according to the method of FIG. 13.

At step 1314, the client device's decoder 1010 can decode the trick-play stream 110 and play back the media content 708. Because the bitstream packaging module 1008 sends the GOPs 108 to the decoder in reverse order, the decoder 1010 can decode the GOPs 108 in reverse order without being aware that they have been reversed. Within each GOP 108, the decoder 1010 can decode and present each extracted frame 102 in the order specified by the frame numbers 804 in the modified slice headers 802. By way of a non-limiting example, the decoder 1010 can receive the frames shown at the top of FIG. 14D, decode them, and present them for playback in the order shown at the bottom of FIG. 14D. FIG. 14E shows the original order of the extracted frames 102 prior to modification by the bitstream packaging module 1008 and the final display order after modification by the bitstream packaging module 1008 and decoding by the decoder 1010. As can be seen from FIG. 14E, the extracted frames 102 can be displayed in reverse order from their original order via the process of FIG. 13.

Figure 15:
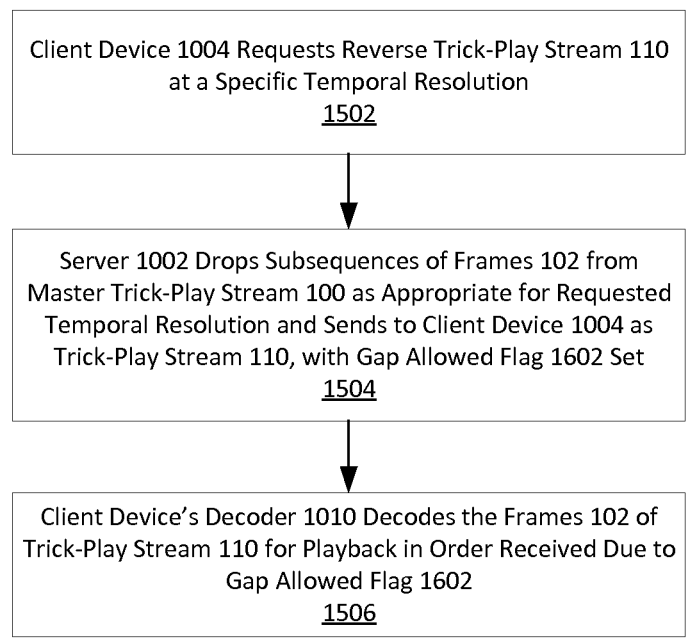
FIG. 15 depicts a second method for delivering trick-play streams derived from a master trick-play stream from a server to a client device.

FIG. 15 depicts a second method for delivering trick-play streams 110 derived from a master trick-play stream 100 to a client device 1004. In some embodiments the bitstream extractor 1006 and/or bitstream packaging module 1008 can be absent or unused when trick-play streams 110 are derived from a master trick-play stream 100 using the method of FIG. 15, such that the server 1002, MANE, or other network element can derive trick-play streams 110 directly and deliver them to a requesting client device 1004. In other embodiments the server 1002 or other network element can pass derived trick-play streams 110 to the requesting client device 1004 through the bitstream extractor 1006 and/or bitstream packaging module 1008. In alternate embodiments, the client device 1004 can receive the full master trick-play stream 100 from a server 1002 or other network element, and perform some or all steps of FIG. 15 itself to locally derive a trick-play stream 110 for a particular temporal resolution.

At step 1502, the client device 1004 can request a trick-play stream corresponding to a specific temporal resolution. The client device 1004 can request that the trick-play stream 110 begin playback at the client device's current position within media content playback.

At step 1504, the server 1002 or other network element can transmit frames 102 from the master trick-play stream 100 to the client device 1004 as a trick-play stream 110, but drop subsequences of frames 102 from the master trick-play stream 100 as appropriate in for the requested temporal resolution in the trick-play stream 110. By way of a non-limiting example, the server 1002 can drop every other frame 102 from the master trick-play stream 100 shown in FIG. 1A when the client device 100 has requested 2× speed playback as described above with respect to FIG. 1B, drop subsequences between every fourth frame 102 from the master trick-play stream 100 shown in FIG. 1A when the client device 100 has requested 4× speed playback as described above with respect to FIG. 1C, and drop subsequences between every eighth frame 102 from the master trick-play stream 100 shown in FIG. 1A when the client device 100 has requested 8× speed playback as described above with respect to FIG. 1D.

Figure 16:
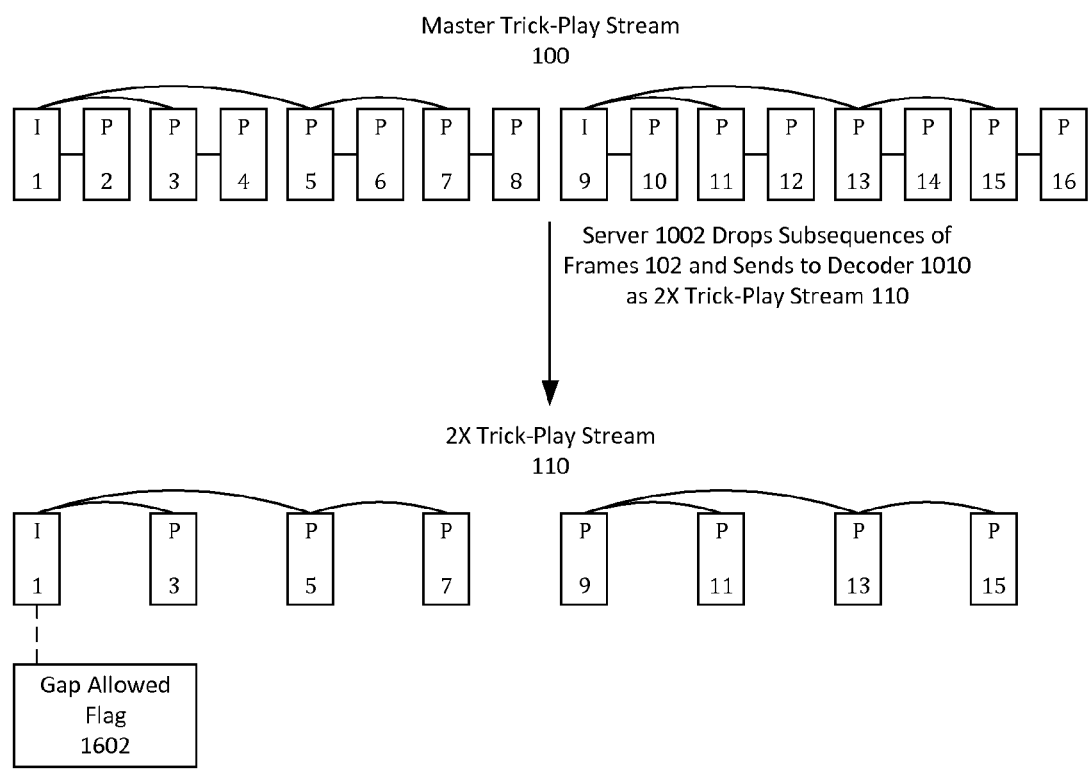
FIG. 16 depicts a trick-play stream being sent with a gap allowed flag.

The server 1002 or other network element can send the trick-play stream 110 derived by dropping subsequences of frames 102 from the master trick-play stream 100 to the client device 1004 with a gap allowed flag 1602 that indicates that subsequences of frames 102 were intentionally dropped, as shown in FIG. 16. By way of a non-limiting example, in H.264 the server 1002 can set the gap allowed flag 1602 as a gaps_in_frame_num_value_allowed_flag in the stream's Sequence Parameter Set (SPS) to indicate that frames 102 were dropped intentionally and therefore that frames 102 being sent as part of the trick-play stream 110 might not have sequential frame numbers 804.

At step 1506, after the client device 1002 has received the trick-play stream 110, the decoder 1010 can decode the received frames 102 in the order they were received. Although the decoder 1010 can normally be configured to look for gaps between reference frames by checking for continuity of frame numbers 804 in consecutive frames 102, the decoder 1010 can determine from the gap allowed flag 1602 set by the server 1002 or other network element that such gaps in the frame numbering sequence are intentional and present the frames 102 as they are received. Because the server 1002 or other network element dropped subsequences of frames 102 from the master trick-play stream 100 when sending the trick-play stream 110, decoding and playback of the received frames 102 can be perceived by viewers as fast-forwarded media content 708.

Figure 17:
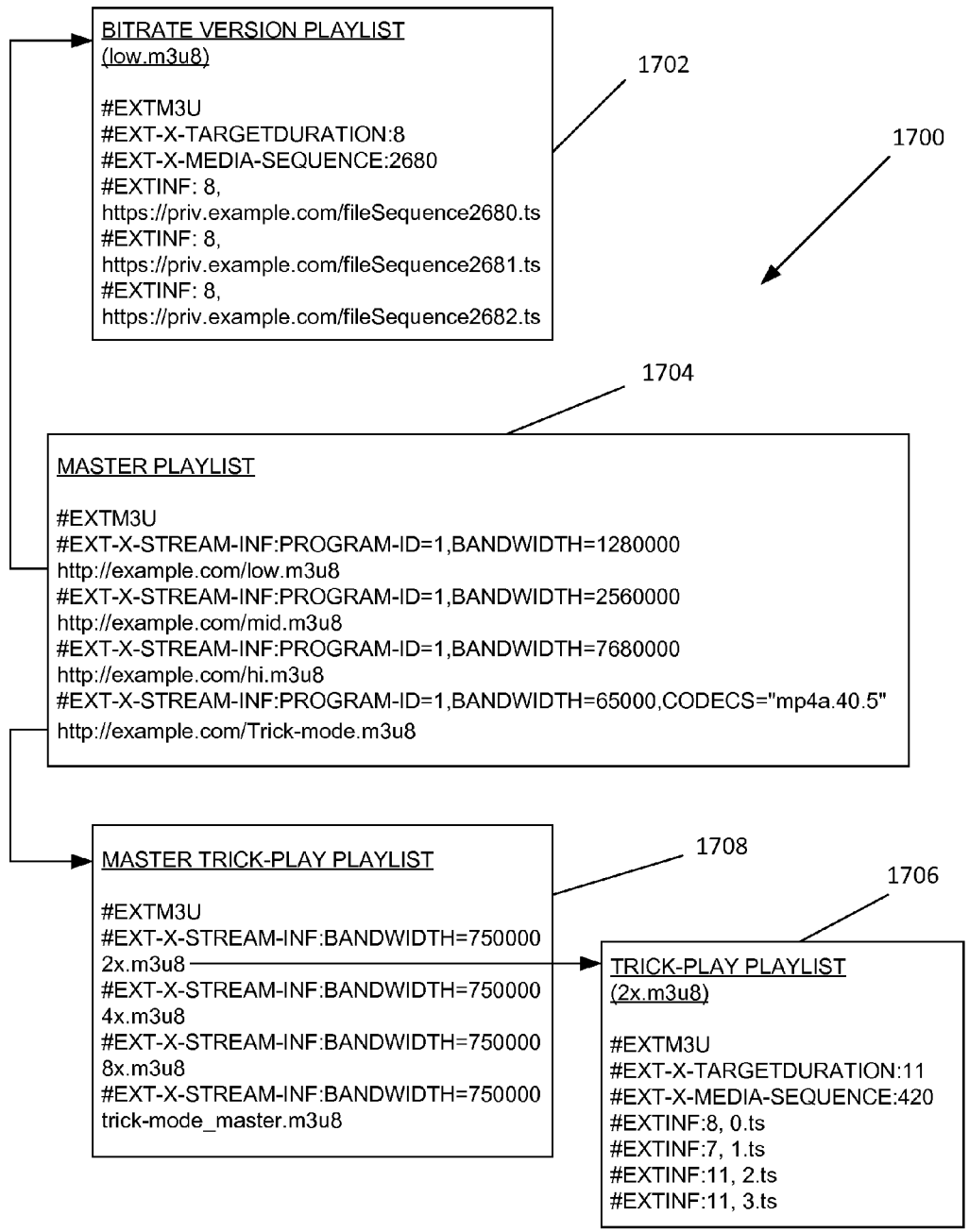
FIG. 17 depicts examples of playlists that a client device can use to request and receive trick-play streams and/or non-trick-play adaptive bitrate streams.

FIG. 17 depicts a non-limiting example of playlists 1700 that a client device 1004 can use to request and receive trick-play streams 110 and/or non-trick-play adaptive bitrate streams 710. In some embodiments, the playlists 1700 can be HTTP Live Streaming (HLS) playlists. By way of a non-limiting example, a stream segmenter in an HLS server can generate playlists 1700 for streams it can serve to client devices 1004. In other embodiments, the playlists 1700 can be playlists for any other media streaming protocol. Playlists 1700 can be advertised to client devices 1004 such that client devices 1004 can use a playlist 1700 to index into any of the streams described by the playlist 1700.

As shown in FIG. 17, playlists 1700 can be text files that include uniform resource locators (URLs) and/or other information regarding segments of adaptive bitrate streams 710 and/or trick-play streams 110 and/or other playlists 1700. In some embodiments a playlist 1700 can be a bitrate version playlist 1702 that includes URLs for segments of a specific adaptive bitrate stream 710. A playlist 1700 can also be a master playlist 1704 that includes URLs for multiple bitrate version playlists 1702. By way of a non-limiting example, a master playlist 1704 can include URLs pointing to different bitrate version playlists 1702 for different adaptive bitrate streams 710, for instance a bitrate version playlist 1702 with URLs for segments of a low bitrate stream, a bitrate version playlist 1702 with URLs for segments of a medium bitrate stream, and a bitrate version playlist 1702 with URLs for segments of a high bitrate stream, as shown in FIG. 17.

A playlist 1700 can also be a trick-play playlist 1706. Each trick-play playlist 1706 can point to segments of a specific trick-play stream 110 that can be derived from a master trick-play stream 100 through the methods described above, such as a 2× trick-play stream 110, 4× trick-play stream 110, reverse trick-play stream 110, or any other trick-play stream 110. In some embodiments URLs to multiple trick-play playlists 1706 can be collected in a master trick-play playlist 1708. In some embodiments, trick-play playlists 1706 and/or master trick-play playlists 1708 can be identified by unique names to distinguish them from bitrate version playlists 1702 master playlists 1704. In other embodiments, trick-play playlists 1706 and/or master trick-play playlists 1708 can have unique tags, metadata, and/or any other characteristics that can distinguish them from bitrate version playlists 1702 master playlists 1704.

As shown in FIG. 17, a master playlist 1704 can include a URL to a master trick-play playlist 1708 in addition to URLs to different bitrate version playlists 1702, such that a client device 1004 can follow the URL to the master trick-play playlist 1708 to obtain URLs for specific trick-play playlists 1706. In other embodiments the master playlist 1704 can include URLs to specific trick-play playlists 1706 directly.

Figure 18:
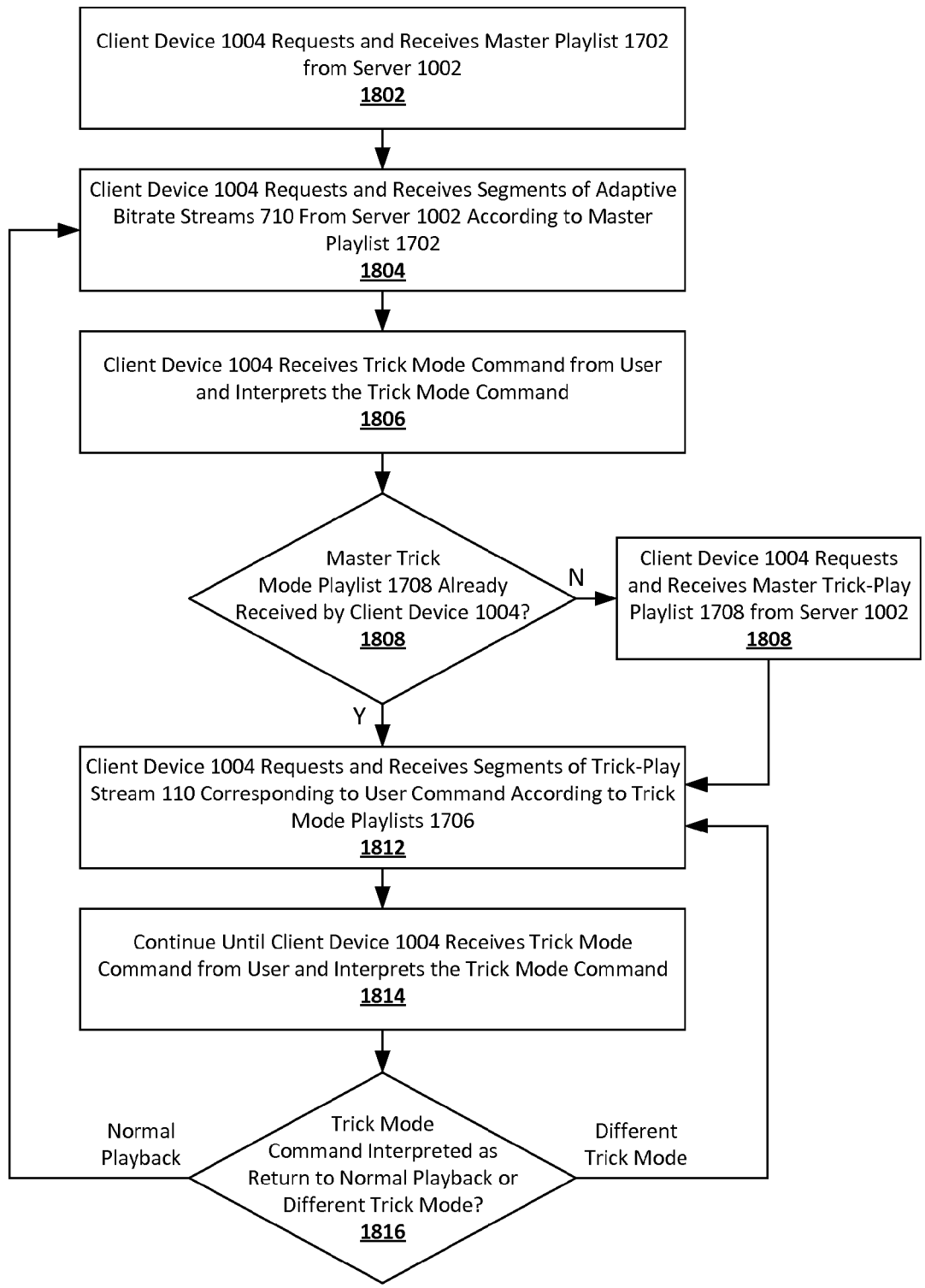
FIG. 18 depicts a method for a client device to use playlists to request segments of regular adaptive bitrate streams and trick-play streams and to transition back and forth between adaptive bitrate streams and trick-play streams depending on user requests.

FIG. 18 depicts a method for a client device 1004 to use playlists 1700 to request segments of regular adaptive bitrate streams 710 and trick-play streams 110 and to transition back and forth between adaptive bitrate streams 710 and trick-play streams 110 depending on user requests.

At step 1802, a client device 1004 can request and receive a master playlist 1704 from a server 1002 or other network element regarding a piece of media content 708.

At step 1804, the client device 1004 can begin playback of the media content 708 by using the master playlist 1704 and/or any bitrate version playlists 1702 to request and receive segments of adaptive bitrate streams 710 from the server 1002 or other network element. The client device 1004 can use the master playlist 1704 and the bitrate version playlists 1702 to switch between different versions of the adaptive bitrate media stream 710 as appropriate for current network conditions, the client device's processing capabilities, and/or any other factor.

At step 1806, when a user inputs a trick mode command instructing the client device 1004 to move to a type of trick mode playback such as fast-forwarding or rewinding, the client device 1004 can interpret the trick mode command to determine which trick-play stream 110 to request and at what location. By way of an non-limiting example, if playback of the media content 708 was progressing at normal forward speed and the user pressed a fast-forward button once, the client device 1004 can interpret the trick mode command as an instruction to request a 2× speed trick-play stream 110 starting at the client device's current point in playback of the media content 708. As another non-limiting example, if playback of the media content 708 was progressing at normal forward speed and the user pressed a rewind button once, the client device 1004 can interpret the trick mode command as an instruction to request a 1× reverse speed trick-play stream 110 starting at the client device's current point in playback of the media content 708.

At step 1808, the client device 1004 can determine if it has already used the master playlist 1704 to request and receive a copy of the master trick-play playlist 1708. If the client device 1002 has not already received the master trick-play playlist 1708, the client device 1004 can request and receive the master trick-play playlist 1708 from the server 1002 or other network element at step 1810 and then move to step 1812. If the client device 1002 has not already received the master trick-play playlist 1708, the client device 1004 can move directly to step 1812.

Figure 12:
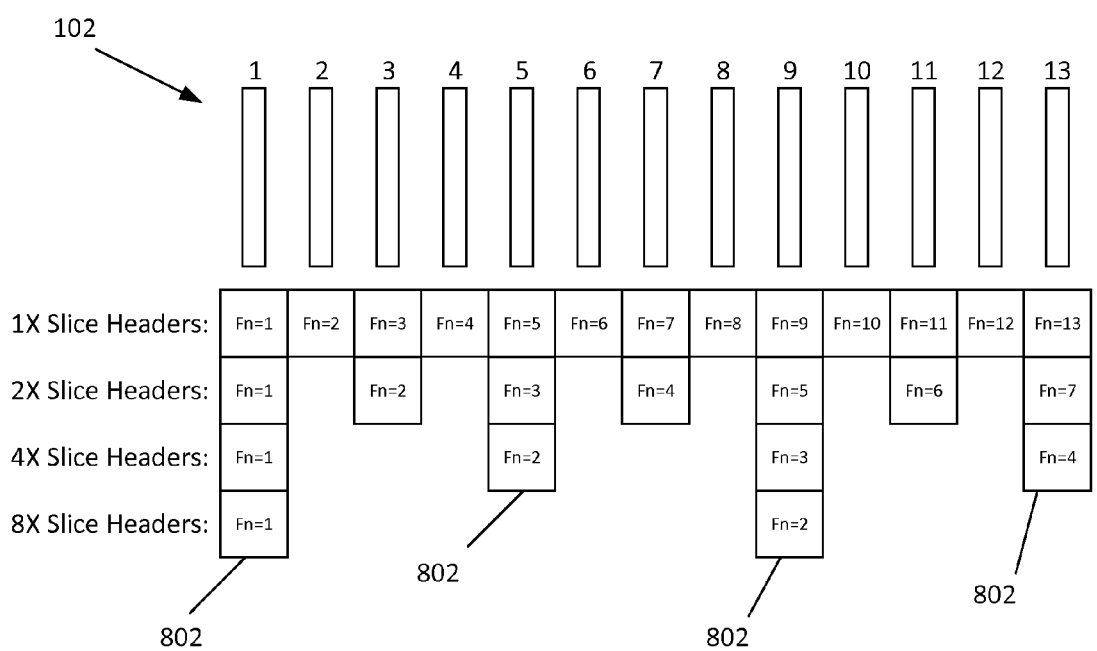
FIG. 12 depicts examples of modifications to slice headers according to the method of FIG. 11.

At step 1812, the client device 1004 can use the master trick-play playlist 1708 and/or any individual trick-play playlists 1706 to request and receive segments of the trick-play stream 110 from the server 1002 or other network element as appropriate for the temporal resolution and/or direction of the requested trick mode. As described above, in some embodiments the trick-play streams 110 can be derived from a master trick-play stream 100 as described above with reference to FIGS. 10, 12, and/or 14.

At step 1814, streaming of the trick-play stream 110 from the server 1002 or other network element corresponding to the temporal resolution and/or direction of the requested trick mode can continue until the client device 1004 receives another trick mode command from a user. At step 1816, the client device 1004 can interpret the latest trick mode command as either a request to return to regular non-trick-mode playback, or as a request to switch to a different trick mode.

If the trick mode command is interpreted during step 1816 to be a request to return to regular non-trick-mode playback, the client device 1004 can return to step 1804 to request and receive segments of non-trick-play adaptive bitrate streams 710. By way of a non-limiting example, while watching fast-forwarded content, a user can press a button to return to playback at normal speed, and the client device 1004 can interpret that as an instruction to resume normal playback, and can return to step 1804 from step 1816.

If the trick mode command is interpreted during step 1816 to be a request to transition to a different trick-play stream 110, the client device 1004 can return to step 1814 to request and receive segments of a different trick-play stream 110. By way of a non-limiting example, if the client device 1004 was already receiving segments of a 2× trick-mode stream, an additional press of a fast-forward button can indicate to the client device that it should transition from the 2× trick-play stream 110 to a 4× trick-play stream 110 at the next opportunity, such as at the beginning of the next GOP 108.

Playback of the media content 708 using either regular adaptive bitrate streams 710 or trick-play streams 110 can continue until the client device pauses or ends playback of the media content 708.

Although the invention has been described in conjunction with specific embodiments thereof, it is evident that many alternatives, modifications and variations will be apparent to those skilled in the art. Accordingly, the invention as described and hereinafter claimed is intended to embrace all such alternatives, modifications and variations that fall within the spirit and broad scope of the appended claims.

What is claimed:

1. A method of generating a trick-play stream, comprising:
   providing a master trick-play stream at a network element, said master trick-play stream having a plurality of groups of pictures, wherein each group of pictures comprises a leading intra-coded frame and a plurality of inter-coded frames, and frames within of each group of pictures are encoded with a temporally scalable hierarchical encoding relationship;
   deriving a trick-play stream from said master trick-play stream for a particular temporal resolution by skipping a consistent pattern of frames from each group of pictures that are not needed to decode other frames at said particular temporal resolution according to said temporally scalable hierarchical encoding relationship and extracting frames not skipped to form the trick-play stream; and
   providing said trick-play stream to a client device, wherein said trick-play stream is packaged to contain the extracted frames and modified slice headers for the extracted frames into the trick-play stream to appear to said client device as a standards-compliant adaptive bitrate stream,
   wherein said temporally scalable hierarchical encoding relationship comprises encoding the frames within each said group of pictures such that a first frame is an I-frame that is independently decodable and subsequent frames are P-frames such that decoding the subsequent frame depends on the first frame,
   wherein deriving a k-fold speed trick-play stream of "kx" speed comprises decoding the extracted frames that include every k.sup.th frame starting from the first frame that is the I-frame and skipping the P-frames between every k.sup.th frame, which form the skipped frames, and wherein the modified slice headers associated with extracted frames are modified such that frame numbers in adjacent extracted frames are sequential and gaps between frame numbers due to the absent frames that were the skipped frames when extracting frames from said master trick-play stream are eliminated.

2. The method of claim 1, wherein deriving said trick-play stream for said particular temporal resolution comprises the extracted frames from said master trick-play stream with a bitstream extractor, with the skipped frames in said consistent pattern of frames being removed, and the packaging includes providing the extracted frames into said trick-play stream with a bitstream packaging module.

3. The method of claim 2, wherein to derive a reversed trick-play stream:

said bitstream extractor extracts frames within a set of said plurality of groups of pictures occurring prior to a specified point in said master trick-play stream;

said bitstream packaging module reverses the order of said set of said plurality of groups of pictures;

said bitstream packaging module provides the modified slice headers associated with extracted frames to reverse the frame numbers associated with all frames in the set of said plurality of groups of pictures; and said bitstream packaging module sends said set of group of pictures to said client device in the reversed order.

4. The method of claim 1, wherein deriving said trick-play stream for said particular temporal resolution comprises selecting particular frames from said master trick-play stream with said network element and sending said particular frames from said network element to said client device as said trick-play stream with an encoded gap allowed flag, wherein said network element selects said particular frames from said master trick-play stream by dropping subsequences of frames in said consistent pattern of frames.

5. The method of claim 1, further comprising encrypting the frames within each group of pictures such that encryption of sets of frames that would be dropped for each different particular temporal resolution when deriving a trick-play stream for that particular temporal resolution are encrypted with a dependent relationship.

6. The method of claim 1, wherein said temporally scalable hierarchical encoding relationship comprises encoding the frames within each said group of pictures such that: the first frame is the I-frame that is independently decodable; a second frame is a P-frame such that decoding the second frame depends on decoding the first frame; a third frame is a P-frame such that decoding the third frame depends on decoding the first frame; a fourth frame is a P-frame such that decoding the fourth frame depends on decoding the third frame; a fifth frame is a P-frame such that decoding the fifth frame depends on decoding the first frame; a sixth frame is a P-frame such that decoding the sixth frame depends on decoding the fifth frame; a seventh frame is a P-frame such that decoding the seventh frame depends on decoding the fifth frame; a eighth frame is a P-frame such that decoding the eighth frame depends on decoding the seventh frame; and decoding of zero frames depends on decoding the second, fourth, sixth, or eighth frames.

7. The method of claim 6, wherein deriving a 2× speed trick-play stream comprises skipping the second, fourth, sixth, and eighth frame of each group of pictures.

8. The method of claim 6, wherein deriving a 4× speed trick-play stream comprises skipping the second, third, fourth, sixth, seventh, and eighth frame of each group of pictures.

9. The method of claim 6, wherein deriving an 8× speed trick-play stream comprises skipping the second, third, fourth, fifth, sixth, seventh, and eighth frame of each group of pictures.

10. The method of claim 1, further comprising advertising a master playlist with said network element, said master playlist comprising information about one or more adaptive bitrate streams and one or more trick-play streams available to be derived, such that said client device follows said master playlist to transition between requesting segments of an adaptive bitrate streams and requesting segments of a trick-play stream.

11. A content delivery system, comprising:

a network element configured to store a master trick-play stream having a plurality of groups of pictures, wherein each group of pictures comprises a leading I-frame and a plurality of P-frames, and frames within of each group of pictures are encoded with a temporally scalable hierarchical encoding relationship;

a bitstream extractor configured to extract frames from said master trick-play stream stored on said network element, wherein said bitstream extractor extracts specific frames and skips other frames that are not extracted in said consistent pattern of frames to provide extracted frames that are not skipped that are included in the trick-play stream; and a bitstream packaging module configured to package the frames extracted by said bitstream extractor into a trick-play stream and send the trick-play stream to a client device, wherein said bitstream packaging module is configure to package said trick-play stream to contain the extracted frames and modified slice headers for the extracted frames such that it appears to said client device as a standards-compliant adaptive bitrate stream, wherein deriving a k-fold speed trick-play stream of "kx" speed comprises decoding the extracted frames that include every k.sup.th frame starting from the first frame that is the I-frame and skipping the P-frames between every k.sup.th frame, which form the skipped frames, and wherein the modified slice headers associated with extracted frames are modified such that frame numbers in adjacent extracted frames are sequential and gaps between frame numbers due to the absent frames that were the skipped frames when extracting frames from said master trick-play stream are eliminated.

12. The content delivery system of claim 11, wherein to derive a reversed trick-play stream:

said bitstream extractor is configured to extract frames within a set of said plurality of groups of pictures occurring prior to a specified point in said master trick-play stream;

said bitstream packaging module is configured to reverse the order of said set of said plurality of groups of pictures;

said bitstream packaging module is configured to provide the modified slice headers associated with extracted frames to reverse the frame numbers associated with all frames in the set of said plurality of groups of pictures; and said bitstream packaging module is configured to send said set of group of pictures to said client device in the reversed order.

* * * * *